US011248136B2

(12) United States Patent
Umebayashi et al.

(10) Patent No.: US 11,248,136 B2
(45) Date of Patent: Feb. 15, 2022

(54) INK JET LIQUID COMPOSITION AND INK JET RECORDING METHOD

(71) Applicant: FUJIFILM CORPORATION, Tokyo (JP)

(72) Inventors: Tsutomu Umebayashi, Kanagawa (JP); Toshihiro Kamada, Kanagawa (JP); Yusuke Fujii, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/279,952

(22) Filed: Feb. 19, 2019

(65) Prior Publication Data
US 2019/0185693 A1    Jun. 20, 2019

Related U.S. Application Data

(63) Continuation of application No. PCT/JP2017/031020, filed on Aug. 29, 2017.

(30) Foreign Application Priority Data

Sep. 29, 2016  (JP) .............. JP2016-192045

(51) Int. Cl.
| B41J 2/01 | (2006.01) |
| C09D 11/36 | (2014.01) |
| C09D 11/101 | (2014.01) |
| B41M 5/00 | (2006.01) |
| C14C 11/00 | (2006.01) |
| B41M 7/00 | (2006.01) |
| C09D 11/102 | (2014.01) |
| C08G 18/67 | (2006.01) |
| C09D 11/106 | (2014.01) |

(52) U.S. Cl.
CPC ........... *C09D 11/36* (2013.01); *B41M 5/0023* (2013.01); *B41M 7/009* (2013.01); *C08G 18/672* (2013.01); *C09D 11/101* (2013.01); *C09D 11/102* (2013.01); *C09D 11/106* (2013.01); *C14C 11/006* (2013.01); *B41M 5/0047* (2013.01); *B41M 5/0076* (2013.01); *B41M 7/0081* (2013.01)

(58) Field of Classification Search
None
See application file for complete search history.

(56) References Cited

U.S. PATENT DOCUMENTS

| 6,344,520 B1* | 2/2002 | Greene ................ C09D 183/06 525/100 |
| 2008/0119593 A1 | 5/2008 | Stramel et al. |
| 2009/0033844 A1* | 2/2009 | Ando ................ C09B 67/0014 349/106 |
| 2009/0190073 A1* | 7/2009 | Yoshino .............. C09B 67/0096 349/106 |
| 2009/0274979 A1 | 11/2009 | Teng |
| 2010/0265309 A1 | 10/2010 | Kaneko et al. |
| 2012/0052257 A1* | 3/2012 | Kyota ................ C09D 4/00 428/195.1 |
| 2012/0225968 A1* | 9/2012 | Nakano ............. C08F 299/06 522/16 |
| 2013/0295342 A1 | 11/2013 | Araki et al. |
| 2014/0063127 A1* | 3/2014 | Umebayashi ....... C09D 11/101 347/56 |
| 2015/0064398 A1 | 3/2015 | Umebayashi |
| 2015/0177618 A1 | 6/2015 | Teng |
| 2015/0231880 A1 | 8/2015 | Nagase et al. |
| 2016/0214345 A1* | 7/2016 | Kataoka .............. B32B 27/08 |
| 2018/0282559 A1 | 10/2018 | Umebayashi |
| 2019/0023928 A1 | 1/2019 | Kamada et al. |

FOREIGN PATENT DOCUMENTS

| CN | 101535425 A | 9/2009 | |
| CN | 101874084 A | 10/2010 | |
| CN | 103666108 A | 3/2014 | |
| EP | 2292708 A1 * | 3/2011 | .......... C09D 11/322 |
| JP | S62-64874 A | 3/1987 | |
| JP | 2004-35597 A | 2/2004 | |
| JP | 2004-231870 A | 8/2004 | |
| JP | 2007-284466 A | 11/2007 | |
| JP | 2010-70754 A | 4/2010 | |
| JP | 2010070754 A * | 4/2010 | |
| JP | 2012-25867 A | 2/2012 | |
| JP | 2012-149228 A | 8/2012 | |
| JP | 149228 A * | 8/2012 | ............. C09D 11/00 |

(Continued)

OTHER PUBLICATIONS

Hitachi Maxel, Energy Ray-Curable Inkjet Ink Composition, 2008, Japan, All pages (Year: 2008).*
Umebayashi, Inkjet Recording Method and Inkjet Recording Device, 2017, Japan, All (Year: 2017).*
Extended European Search Report dated Sep. 5, 2019, issued in corresponding EP Patent Application No. 17855539.7.
International Search Report issued in International Application No. PCT/JP2017/031020 dated Oct. 3, 2017.

(Continued)

*Primary Examiner* — Erica S Lin
*Assistant Examiner* — Tracey M McMillion
(74) *Attorney, Agent, or Firm* — Solaris Intellectual Property Group, PLLC

(57) ABSTRACT

Provided is an ink jet liquid composition including an organic solvent, a bifunctional urethane (meth)acrylate oligomer having a weight-average molecular weight of 2,000 to 15,000, a photopolymerization initiator, and a vinyl chloride-vinyl acetate copolymer, in which a content of the organic solvent is 40% by mass or more and 90% by mass or less with respect to a total mass of the liquid composition. Also provided is an ink jet recording method using the ink jet liquid composition.

15 Claims, No Drawings

(56) References Cited

FOREIGN PATENT DOCUMENTS

| | | | |
|---|---|---|---|
| JP | 2012149228 A * | 8/2012 | ............ C09D 11/101 |
| JP | 2013-502480 A | 1/2013 | |
| JP | 2013-237834 A | 11/2013 | |
| JP | 2013-241610 A | 12/2013 | |
| JP | 2014-177551 A | 9/2014 | |
| JP | 2015-47748 A | 3/2015 | |
| JP | 2015-150824 A | 8/2015 | |
| JP | 2016-150986 A | 8/2016 | |
| JP | 2016150986 A * | 8/2016 | |
| WO | 2017104845 A1 | 6/2017 | |
| WO | 2017169371 A1 | 10/2017 | |
| WO | 2018159236 A1 | 9/2018 | |

OTHER PUBLICATIONS

Written Opinion of the ISA issued in International Application No. PCT/JP2017/031020 dated Oct. 3, 2017.
International Preliminary Report on Patentability issued in International Application No. PCT/JP2017/031020 dated Aug. 28, 2018.
Office action dated Nov. 22, 2019 from the IPO in a Indian patent application No. 201947010427 corresponding to the instant patent application.
Office action dated Jan. 28, 2021 from the DGIP in a Indonesian patent application No. PID201902604 corresponding to the instant patent application.
Ding Hao et al., A Practical Handbook of the Plastics Industry, Second Edition, p. 331, Chemical Industry Press, Aug. 2000.
"Chinese Encyclopedia of Chemical Products", edited by Chemical Industry Publishing House, 3rd edition, p. 907, Chemical Industry Publishing House, Jan. 2005.
English language translation of the following: Office action dated Mar. 30, 2021 from the SIPO in a Chinese patent application No. 201780055552.4 corresponding to the instant patent application. This office action translation is submitted now in order to supplement the understanding of the cited references which are being disclosed in the instant Information Disclosure Statement.

* cited by examiner

INK JET LIQUID COMPOSITION AND INK JET RECORDING METHOD

CROSS-REFERENCE TO RELATED APPLICATIONS

This application is a Continuation of International Application No. PCT/JP2017/031020 filed on Aug. 29, 2017, which claims priority to Japanese Patent Application No. 2016-192045 filed on Sep. 29, 2016. The entire contents of these applications are incorporated herein by reference.

BACKGROUND OF THE INVENTION

1. Field of the Invention

The present disclosure relates to an ink jet liquid composition and an ink jet recording method.

2. Description of the Related Art

As an image recording method of forming an image on a recording medium such as paper or plastic, based on an image data signal, there are an electrophotographic method, a sublimation-type or fusion-type thermal transfer method, a screen printing method, and an ink jet method.

In the ink jet method, a printing device is inexpensive, a plate is not required at the time of printing, and image formation is directly carried out on a recording medium by jetting an ink composition only to a necessary image area. Thus, the ink composition can be used with excellent efficiency, and the running cost becomes low particularly in a case of small lot production. Further, the ink jet method generates little noise and is excellent as an image recording method. Therefore, the ink jet method has been attracting attention in recent years.

In addition, as an ink jet ink, a solvent ink, an aqueous ink, an ultraviolet curable-type ink, an ultraviolet curable-type solvent ink (solvent UV ink), and the like may be exemplified.

Conventional ink jet ink compositions include the compounds described in JP2013-502480A, JP2013-241610A, JP2014-177551A, and JP1987-064874A (JP-S62-064874A).

SUMMARY OF THE INVENTION

An object of an embodiment of the present invention is to provide an ink jet liquid composition with which even in a case of forming a cured film using a base material having an irregular shape, the obtained cured film has high coating uniformity and excellent bendability.

Another object of another embodiment of the present invention to provide an ink jet recording method using the ink jet liquid composition.

Means for achieving the above objects includes the following aspects.

<1> An ink jet liquid composition comprising: an organic solvent; a bifunctional urethane (meth)acrylate oligomer having a weight-average molecular weight of 2,000 to 15,000; a photopolymerization initiator; and a vinyl chloride-vinyl acetate copolymer, in which a content of the organic solvent is 40% by mass or more and 90% by mass or less with respect to a total mass of the liquid composition.

<2> The ink jet liquid composition according to <1>, in which a total content Mp of a polymerizable compound and a total content Mc of the vinyl chloride-vinyl acetate copolymer contained in the liquid composition satisfy the following relationship.

$$0.1 \leq Mc/Mp \leq 0.4$$

<3> The ink jet liquid composition according to <1> or <2>, in which a total content of a polymerizable compound and the vinyl chloride-vinyl acetate copolymer contained in the liquid composition is 10% by mass or more and 20% by mass or less with respect to the total mass of the liquid composition.

<4> The ink jet liquid composition according to any one of <1> to <3>, in which a content of the vinyl chloride-vinyl acetate copolymer is 1.0% by mass or more and 3.0% by mass or less with respect to the total mass of the liquid composition.

<5> The ink jet liquid composition according to any one of <1> to <4>, in which a boiling point of the organic solvent is 150° C. or higher and 250° C. or lower.

<6> The ink jet liquid composition according to any one of <1> to <5>, in which a total content Md of a bifunctional (meth)acrylate compound and a total content Mm of a polyfunctional (meth)acrylate compound contained in the liquid composition satisfy Md>Mm.

<7> The ink jet liquid composition according to any one of <1> to <6>, further comprising: an organopolysiloxane compound.

<8> The ink jet liquid composition according to <7>, in which a content of the organopolysiloxane compound is 1.5 parts by mass or more and 15 parts by mass or less with respect to a total 100 parts by mass of a polymerizable compound and the vinyl chloride-vinyl acetate copolymer.

<9> The ink jet liquid composition according to <7> or <8>, in which the organopolysiloxane compound is a compound having a polysiloxane chain and an acrylic resin chain.

<10> The ink jet liquid composition according to any one of <1> to <9>, in which a colorant is not contained.

<11> An ink jet recording method comprising: a step of applying the ink jet liquid composition according to any one of <1> to <10> to a base material by an ink jet recording head.

<12> The ink jet recording method according to <11>, in which the base material is a base material having an irregular shape in at least a part of a surface.

<13> The ink jet recording method according to <11> or <12>, in which the base material is leather.

<14> An ink jet recording method comprising: a step of preparing a base material having a decorative layer formed thereon; a step of applying the ink jet liquid composition according to any one of <1> to <10> to the decorative layer by an ink jet recording head; a step of drying the ink jet liquid composition on the decorative layer by applying heat; and a step of curing the ink jet liquid composition by irradiating the ink jet liquid composition with an ultraviolet ray, in which the base material having the decorative layer formed thereon has an irregular shape in at least a part of a surface.

According to an embodiment of the present invention, it is possible to provide an ink jet liquid composition with which even in a case of forming a cured film using a base material having an irregular shape, the obtained cured film has high coating uniformity and excellent bendability.

According to another embodiment of the present invention, it is possible to provide an ink jet recording method using the ink jet liquid composition.

DESCRIPTION OF THE PREFERRED EMBODIMENTS

Hereinafter, the present disclosure will be described in detail.

In present specification, "xx to yy" refers to a numerical value range that includes xx and yy.

In present specification, the term "(meta)acrylic" is a term used as a concept encompassing both acrylic and methacrylic, and the term "(meth)acryloyl" is a term used as a concept encompassing both acryloyl and methacryloyl.

A hydrocarbon group such as an alkyl group, an aryl group, an alkylene group or an arylene group in the present disclosure may have a branch or a ring structure unless otherwise specified.

In addition, in the present disclosure, "% by mass" and "% by weight" are the same and "parts by mass" and "parts by weight" are the same.

In addition, in the present disclosure, a combination of preferable embodiments is a more preferable embodiment.

Further, the weight-average molecular weight (Mw) in the present disclosure is a molecular weight detected by using a gel permeation chromatography (GPC) analyzer using columns of TSKgel GMHxL, TSKgel G4000HxL, and TSKgel G2000HxL (all trade name, manufactured by Tosoh Corporation), tetrahydrofuran (THF) as a solvent, and a differential refractometer and shown in terms of polystyrene as a standard substance, unless otherwise specified.

Hereinafter, the present disclosure will be described in detail.

(Ink Jet Liquid Composition)

An ink jet liquid composition according to an embodiment of the present disclosure (hereinafter, also simply referred to as a "liquid composition") contains an organic solvent, a bifunctional urethane (meth)acrylate oligomer having a weight-average molecular weight of 2,000 or more and 15,000 or less, a photopolymerization initiator, and a vinyl chloride-vinyl acetate copolymer, and a content of the organic solvent is 40% by mass or more and 90% by mass or less with respect to a total mass of the liquid composition.

As a result of detailed examinations conducted by the present inventors, it has been found that by adopting an ink jet liquid composition having the above composition, even in a case where a cured film is formed using a base material having an irregular shape, the obtained cured film has high coating uniformity and has excellent bendability.

Although the detailed mechanism is unknown, it is assumed that by setting the content of the organic solvent to 40% by mass or more and 90% by mass or less with respect to the total mass of the liquid composition, a dried film with a thin film thickness in which components other than the organic solvent are uniformly applied is easily formed and cured to obtain a flexible and tough cured film so that the obtained cured film has high coating uniformity and excellent bendability.

In addition, it is assumed that by containing the bifunctional urethane (meth)acrylate oligomer having a weight-average molecular weight of 2,000 or more and 15,000 or less, a cured film having both flexibility and strength can be obtained and the bendability of the obtained cured film is excellent.

Further, it is assumed that by containing the vinyl chloride-vinyl acetate copolymer, even in a case where the viscosity increase in the composition at the time of drying is fast and a base material having an irregular shape is used, followability to the irregular shape is excellent, a composition reservoir is prevented from being formed in the concave portion, and a cured film is prevented from not being formed or a thin portion is prevented from being formed in the convex portion, thereby even in a case of forming a cured film using the base material having an irregular shape, the obtained cured film has high coating uniformity and has excellent bendability.

Hereinafter, the present disclosure will be described in detail.

The ink jet liquid composition according to the embodiment of the present disclosure can be suitably used as an ink jet liquid composition to be applied to a base material having an irregular shape in at least a part of the surface such as leather and can be more suitably used as an ink jet liquid composition to be applied to leather.

Regarding the term "to be applied to the base material", the liquid composition may be directly applied to the base material or after a layer such as a decorative layer is provided to the base material, the liquid composition may be applied to the layer.

The leather is not particularly limited, and examples thereof include natural leather, synthetic leather, and artificial leather. In addition, the above-mentioned leather may be one subjected to treatment such as tanning.

It is needless to say that the ink jet liquid composition according to the embodiment of the present disclosure may be applied to a base material having an irregular shape in at least a part of the surface and a normal smooth base material.

The term "irregular shape" of the surface of the base material in the present disclosure is a portion satisfying Expression R.

$$L2 \geq 1.05 \times L1 \quad \text{Expression R}$$

For L1 and L2, the following lengths are measured on the base material by a confocal laser microscope.

L1: a projection length between a point A on the surface of the base material where the cross-sectional shape is analyzed by a confocal laser microscope and a point B on the same base material surface as the point A (linear distance between point A and point B)

L2: a length from the point A calculated from the cross-sectional shape measured by a confocal laser microscope to the point B along the irregular shape on the base material surface (length of cross-sectional curve between point A and point B)

In a normal smooth base material, the value of L2 is less than 1.05 times the value of L1.

As the confocal laser microscope, a shape analysis laser microscope (VK-X 250/260) manufactured by Keyence Corporation may be suitably used.

In addition, from the viewpoint of further exerting the effects of the liquid composition according to the embodiment of the present disclosure, the base material used in the present disclosure is preferably a base material having a portion satisfying Expression R-1 in at least a part of the surface, more preferably a base material having a portion satisfying Expression R-2 in at least a part of the surface, and even more preferably a base material having a portion satisfying Expression R-3 in at least a part of the surface.

$$L2 \geq 1.10 \times L1 \quad \text{Expression R-1}$$

$$5 \geq L2 \geq 1.10 \times L1 \quad \text{Expression R-2}$$

$$3 \geq L2 \geq 1.20 \times L1 \quad \text{Expression R-3}$$

The base material used in the present disclosure is preferably a base material having an irregular shape in an area of 50% by area or more of the surface on at least one surface, and more preferably a base material having an irregular shape in an area of 70% by area or more of the surface on at least one surface.

The liquid composition according to the embodiment of the present disclosure is an ink composition that is curable by active radiation. The term "active radiation" refers to a radiation capable of imparting energy to generate an initiating species in the liquid composition by the irradiation and includes an α-ray, a γ-ray, an X-ray, an ultraviolet ray, a visible ray, an electron beam and the like. Among these, from the viewpoint of curing sensitivity and easy availability of the apparatus, an ultraviolet ray, a visible ray and an electron beam are preferable and an ultraviolet ray is more preferable.

The liquid composition according to the embodiment of the present disclosure preferably contains as little water as possible and even in a case where the liquid composition contains water, the water content is preferably 5% by mass or less, more preferably 1% by mass or less, and even more preferably 0.5% by mass or less with respect to the total mass of the liquid composition.

In addition, the liquid composition according to the embodiment of the present disclosure can be used for various applications such as an ink composition, a resist, an image recording layer of a planographic printing plate precursor, a coating agent, a paint, an adhesive, a pressure sensitive adhesive, a coating composition, a functional film, a film, an optical material, a printing plate material, a semiconductor material, a recording material, a paper additive, a medical material, a plastic, a functional gel, and a cosmetic material. Among these, the liquid composition can be suitably used for a coating composition or an ink composition and more suitably used for a coating composition.

Further, the liquid composition can be more suitably used for a coating composition for protecting the decorative layer on the base material, and particularly suitably used for a coating composition for protecting a decorative layer on leather.

Hereinafter, each component used in the liquid composition according to the embodiment of the present disclosure will be described in detail.

<Organic Solvent>

The ink jet liquid composition according to the embodiment of the present disclosure contains an organic solvent, and the content of the organic solvent is 40% by mass or more and 90% by mass or less with respect to the total mass of the liquid composition.

As the organic solvent, known solvents used for solvent inks and active radiation curable solvent inks can be used, and examples thereof include organic solvents described in New Edition Solvent Pocketbook (The Society of Synthetic Organic Chemistry, Japan, 1994).

In addition, the organic solvent is preferably an organic solvent having a boiling point of 150° C. or higher and 250° C. or lower and more preferably an organic solvent having a boiling point of 150° C. or higher and 200° C. or lower from the viewpoint of ink jettability, and film uniformity, abrasion resistance, and chemical resistance of the obtained cured film.

The organic solvents that can be used in the present disclosure may be used singly or in combination of two or more thereof.

Examples of the organic solvent include (poly)alkylene glycol monoalkyl ethers such as diethylene glycol monoethyl ether, triethylene glycol monomethyl ether, dipropylene glycol monomethyl ether, and tripropylene glycol monomethyl ether, (poly)alkylene glycol dialkyl ethers such as ethylene glycol dibutyl ether, diethylene glycol dimethyl ether, diethylene glycol diethyl ether, dipropylene glycol diethyl ether, and tetraethylene glycol dimethyl ether, (poly) alkylene glycol acetates such as diethylene glycol acetate, (poly)alkylene glycol diacetates such as ethylene glycol diacetate and propylene glycol diacetate, (poly)alkylene glycol monoalkyl ether acetates such as ethylene glycol monobutyl ether acetate and propylene glycol monomethyl ether acetate, ketones such as methyl ethyl ketone and cyclohexanone, lactones such as γ-butyrolactone, esters such as ethyl acetate, propyl acetate, butyl acetate, 3-methoxybutyl acetate, methyl propionate, and ethyl propionate, cyclic ethers such as tetrahydrofuran and dioxane, and amides such as dimethylformamide and dimethylacetamide.

In addition, as the (poly)alkylene glycol is preferably (poly)ethylene glycol and/or (poly)propylene glycol.

Among these, from the viewpoint of ink jettability, and film uniformity and chemical resistance of the obtained cured film, it is preferable to use at least one organic solvent selected from the group consisting of alkylene glycol monoalkyl ether acetates, alkylene glycol monoalkyl ethers, alkylene glycol dialkyl ethers, alkylene glycol acetates, polyalkylene glycol monoalkyl ether acetates, polyalkylene glycol monoalkyl ethers, polyalkylene glycol dialkyl ethers, polyalkylene glycol acetates, ketones, lactones, and esters, it is more preferable to use at least one organic solvent selected from the group consisting of alkylene glycol monoalkyl ether acetates, alkylene glycol dialkyl ethers, polyalkylene glycol monoalkyl ether acetates, polyalkylene glycol dialkyl ethers, ketones, lactones, and esters, it is even more preferable to use esters, and it is particularly preferable to use 3-methoxybutyl acetate.

The content of the organic solvent in the ink jet liquid composition according to the embodiment of the present disclosure is 40% by mass or more and 90% by mass or less with respect to the total mass of the liquid composition, and is preferably 50% by mass or more and 85% by mass or less, more preferably 60% by mass or more and 83% by mass or less, and particularly preferably 70% by mass or more and 82% by mass or less from the viewpoint of film uniformity, abrasion resistance, bendability, and chemical resistance of the obtained cured film.

<Bifunctional Urethane (Meth)Acrylate Oligomer Having Weight-Average Molecular Weight of 2,000 or More and 15,000 or Less>

The ink jet liquid composition according to the embodiment of the present disclosure contains a bifunctional urethane (meth)acrylate oligomer weight-average molecular weight of 2,000 or more and 15,000 or less as a polymerizable compound.

The urethane (meth)acrylate oligomer in the present disclosure may be a compound having one or more urethane bonds and having a (meth)acryloxy group.

It is essential for the ink jet liquid composition according to the embodiment of the present disclosure to contain the "bifunctional" urethane (meth)acrylate oligomer having the above-mentioned weight-average molecular weight. Since the bifunctional urethane (meth)acrylate oligomer is used, the film uniformity, abrasion resistance, bendability, and chemical resistance of the obtained cured film are excellent.

On the other hand, in a case in which only a trifunctional or higher urethane (meth)acrylate oligomer is used, bendability is deteriorated and in a case where only a monofunctional urethane (meth)acrylate oligomer is used, the film uniformity and the abrasion resistance and chemical resistance of the obtained cured film are deteriorated.

The weight-average molecular weight (Mw) of the bifunctional urethane (meth)acrylate oligomer is preferably 3,500 or more and 14,000 or less and more preferably 4,000 or more and 8,000 or less from the viewpoint of film uniformity, abrasion resistance, bendability, and chemical resistance of the obtained cured film.

The bifunctional urethane (meth)acrylate oligomer having a weight-average molecular weight of 2,000 or more and 15,000 or less may be used singly or in combination of two or more thereof.

In addition, the ink jet liquid composition according to the embodiment of the present disclosure may contain a urethane (meth)acrylate oligomer other than the bifunctional urethane (meth)acrylate oligomer but the content of the urethane (meth)acrylate is preferably smaller than the content of the bifunctional urethane (meth)acrylate oligomer.

As the bifunctional urethane (meth)acrylate oligomer, a commercially available product may be used.

Examples of the commercially available product include CN9001 (manufactured by Sartomer Company Inc.), and SHIKO UV-3200B, SHIKO UV-3300B, SHIKO UV-3310B, and SHIKO UV-6630B (all manufactured by The Nippon Synthetic Chemical Industry Co., Ltd.).

The content of the bifunctional urethane (meth)acrylate oligomer having a weight-average molecular weight of 2,000 or more and 15,000 or less in the ink jet liquid composition according to the embodiment of the present disclosure is preferably 1% by mass or more and 50% by mass or less, more preferably 3% by mass or more and 30% by mass or less, and particularly preferably 5% by mass or more and 20% by mass or less with respect to the total mass of the liquid composition from the viewpoint of film uniformity, abrasion resistance, bendability, and chemical resistance of the obtained cured film.

<Photopolymerization Initiator>

The ink jet liquid composition according to the embodiment of the present disclosure contains a photopolymerization initiator (hereinafter, also simply referred to as a "polymerization initiator").

As the polymerization initiator that can be used in the present disclosure, a photoradical polymerization initiator is preferably used from the viewpoint of excellent curability and fixing property.

The polymerization initiator in the present disclosure is a compound that causes a chemical change through the action of light or interaction with the electron excited state of a sensitizer to generate a polymerization initiating species.

The photopolymerization initiator can be selected from photopolymerization initiators sensitive to active radiation to be emitted such as an ultraviolet ray in a range of 400 nm to 200 nm, a far ultraviolet ray, a g-ray, an h-ray, an i-ray, a KrF excimer laser beam, an ArF excimer laser beam, an electron beam, an X-ray, a molecular beam or an ion beam.

Preferable examples of the photopolymerization initiator includes (a) aromatic ketones, (b) aromatic onium salts, (c) organic peroxides, (d) hexaarylbiimidazole compounds, (e) ketoxime esters compounds, (f) borate compounds, (g) azinium compounds, (h) metallocene compounds, (i) active ester compounds, and (j) carbon-halogen bond-containing compounds.

As the radical polymerization initiator, from the viewpoint of curability, aromatic ketones are preferable.

In addition, as the radical polymerization initiator, an acylphosphine oxide compound is preferable.

As the acylphosphine oxide compound, a monoacylphosphine oxide compound, a bisacylphosphine oxidecompound, and the like can be used, and as the monoacylphosphine oxide compound, a known monoacylphosphine oxide compound can be used. Examples thereof include monoacylphosphine oxide compounds described in JP1985-008047B (JP-S60-008047B) and JP1988-040799B (JP-S63-040799B). Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluylphenylphosphinate, methyl o-toluylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-toluyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoylbisdiphenylphosphine oxide, pivaloyldiphenylphosphine oxide, p-toluyldiphenylphosphine oxide, 4-(t-butyl)benzoyldiphenylphosphine oxide, 2-methylbenzoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP1991-101686A (JP-H03-101686A), JP1993-345790A (JP-H05-345790A), and JP1994-298818A (JP-H06-298818A). Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis (2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis (2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphenylphosphine oxide.

Among them, as the acylphosphine oxide compound in the present disclosure, bis(2,4,6-trimethylbenzoyl)phenylphosphine oxide (IRGACURE 819: manufactured by BASF SE), bis(2,6-dimethoxybenzoyl)-2,4,4-trimethylpentylphenylphosphine oxide, 2,4,6-trimethylbenzoyldiphenylphosphine oxide (DAROCUR TPO: manufactured by BASF SE, LUCIRIN TPO: manufactured by BASF SE), 1-[4-(2-hydroxyethoxy)phenyl]-2-hydroxy-2-methyl-1-propane-1-one (IRGACURE 2959: manufactured by BASF SE), and the like are preferable.

The polymerization initiator may be used singly or in combination of two or more thereof. In addition, as long as the effects of the liquid composition according to the embodiment of the present disclosure are not impaired, a known sensitizer for the purpose of improving sensitivity can be used in combination.

The liquid composition according to the embodiment of the present disclosure may contain, as the polymerization initiator, a compound that functions as a sensitizer (hereinafter also simply referred to as a "sensitizer") in order to absorb a specific actinic ray to promote decomposition of the polymerization initiator.

Examples of the sensitizer include polynuclear aromatic compounds (such as pyrene, perylene, triphenylene, and 2-ethyl-9,10-dimethoxy anthracene), xanthenes (such as fluorescein, eosin, erythrosine, rhodamine B, and rose bengal), cyanines (such as thiacarbocyanine, and oxacarbocyanine), merocyanines (such as merocyanine, and carbomerocyanine), thiazines (such as thionine, methylene blue, and toluidine blue), acridines (such as acridine orange, chloroflavin, and acriflavine), anthraquinones (such as anthraquinone), squaryliums (such as squarylium), and coumarins (such as 7-diethylamino-4-methylcoumarin).

The sensitizer may be used singly or in a combination of two or more thereof.

The content of the polymerization initiator in the liquid composition according to the embodiment of the present disclosure is preferably 0.1% by mass to 20.0% by mass, more preferably 0.5% by mass to 18.0% by mass, and even more preferably 1.0% by mass to 15.0% by mass with respect to the total mass of the liquid composition. A case where the amount of the polymerization initiator added is in the above range is suitable from the viewpoint of excellent curability and reduction of sticky feeling of the surface.

In addition, the content ratio (mass ratio) between the polymerization initiator and the polymerizable compound to be used in combination (polymerization initiator:polymerizable compound) is preferably 0.5:100 to 30:100, more preferably 1:100 to 15:100, and even more preferably 2:100 to 10:100, respectively.

The polymerizable compound includes the bifunctional urethane (meth)acrylate oligomer having a weight-average molecular weight of 2,000 or more and 15,000 or less.

<Vinyl Chloride-Vinyl Acetate Copolymer>

The ink jet liquid composition according to the embodiment of the present disclosure contains a vinyl chloride-vinyl acetate copolymer (also referred to as a "specific copolymer").

The vinyl chloride-vinyl acetate copolymer in the present disclosure does not have a polymerizable group.

The copolymerization ratio in the vinyl chloride-vinyl acetate copolymer in the present disclosure is not particularly limited, but from the viewpoint of ink jettability and film uniformity of the obtained cured film, the copolymerization amount of vinyl chloride is preferably 70% by mass to 95% by mass, the copolymerization amount of vinyl acetate is preferably 5% by mass to 30% by mass, the copolymerization amount of vinyl chloride is more preferably 80% by mass to 93% by mass, the copolymerization amount of vinyl acetate is more preferably 7% by mass to 20% by mass, the copolymerization amount of vinyl chloride is particularly preferably 80% by mass to 90% by mass, and the copolymerization amount of vinyl acetate is particularly preferably 10% by mass to 20% by mass.

The weight-average molecular weight (Mw) of the vinyl chloride-vinyl acetate copolymer is preferably 5,000 or more and 100,000 or less, more preferably 10,000 or more and 70,000 or less, and even more preferably 12,000 or more and 50,000 or less from the viewpoint of ink jettability and film uniformity.

As the vinyl chloride-vinyl acetate copolymer, a commercially available product may be used.

Examples of the commercially available product include a vinyl chloride-vinyl acetate copolymer manufactured by Wacker Chemie Gmbh, and SOLBIN CL, CNL, CSR, TA3, and TASR manufactured by Nissin Chemical co., ltd.

The vinyl chloride-vinyl acetate copolymer may be used singly or in a combination of two or more thereof.

The content of the vinyl chloride-vinyl acetate copolymer in the ink jet liquid composition according to the embodiment of the present disclosure is preferably 0.1% by mass or more and 10% by mass or less, more preferably 0.5% by mass or more and 5% by mass or less, and particularly preferably 1% by mass or more and 3% by mass or less with respect to the total mass of the liquid composition from the viewpoint of ink jettability and film uniformity, abrasion resistance, and chemical resistance of the obtained cured film.

<Organopolysiloxane Compound>

The ink jet liquid composition according to the embodiment of the present disclosure preferably contains an organopolysiloxane compound from the viewpoint of ink jettability and film uniformity.

The organopolysiloxane compound is not particularly limited as long as the compound has an organic group and two or more silicon atoms forms a siloxane bond in the compound. From the viewpoint of ink jettability and film uniformity, a polysiloxane compound having an acrylic resin chain is preferable, a compound having a polysiloxane chain and an acrylic resin chain is more preferable, and a silicone resin grafted with an acrylic resin chain is particularly preferable.

The organopolysiloxane compound is not particularly limited, and examples thereof include CHALINE series manufactured by Nissin Chemical Industry Co., Ltd., and SIMAC series manufactured by Toagosei Co., Ltd.

The organopolysiloxane compound may be used singly or in combination of two or more thereof.

The content of the organopolysiloxane compound in the ink jet liquid composition according to the embodiment of the present disclosure is preferably 1 part by mass or more and 30 parts by mass or less, more preferably 1.5 parts by mass or more and 15 parts by mass or less, and particularly preferably 1.5 parts by mass or more and 5 parts by mass or less with respect to a total 100 parts by mass of the polymerizable compound and the vinyl chloride-vinyl acetate copolymer from the viewpoint of ink jettability, and film uniformity and chemical resistance of the obtained cured film.

In addition, the content of the organopolysiloxane compound in the ink jet liquid composition according to the embodiment of the present disclosure is preferably 0.01% by mass or more and 8% by mass or less, more preferably 0.1% by mass or more and 4% by mass or less, and particularly preferably 0.25% by mass or more and 1.5% by mass or less with respect to the total mass of the liquid composition from the viewpoint of ink jettability, and film uniformity and chemical resistance of the obtained cured film.

<Other Polymerizable Compounds>

The ink jet liquid composition according to the embodiment of the present disclosure may contain a polymerizable compound (another polymerizable compound) other than the bifunctional urethane (meth)acrylate oligomer having a weight-average molecular weight of 2,000 or more and 15,000 or less.

Another polymerizable compound is not particularly limited and various known polymerizable compounds known as radical polymerizable compounds can be used as well as a urethane (meth)acrylate oligomer other than the bifunctional urethane (meth)acrylate oligomer.

As another polymerizable compound, an ethylenically unsaturated compound is preferable, at least one compound selected from the group consisting of a (meth)acrylate compound, a (meth)acrylamide compound, and an aromatic vinyl compound is more preferable, and a (meth)acrylate compound is even more preferable.

Another polymerizable compound may be used singly or in combination of two or more thereof.

In addition, the content of another polymerizable compound in the liquid composition according to the embodiment of the present disclosure is preferably smaller than the content of the bifunctional urethane (meth)acrylate oligomer.

A total content Mp of the polymerizable compound and a total content Mc of the vinyl chloride-vinyl acetate copolymer contained in the liquid composition according to the embodiment of the present disclosure preferably satisfy Expression r1, more preferably satisfy Expression r2, and even more preferably satisfy Expression r3 from the viewpoint of ink jettability, film uniformity, abrasion resistance, and chemical resistance of the obtained cured film.

$$0.03 \leq Mc/Mp \leq 1.0 \quad \text{Expression r1}$$

$$0.1 \leq Mc/Mp \leq 0.4 \quad \text{Expression r2}$$

$$0.1 \leq Mc/Mp \leq 0.3 \quad \text{Expression r3}$$

A total content (Mp+Mc) of the polymerizable compound and the vinyl chloride-vinyl acetate copolymer contained in the liquid composition according to the embodiment of the present disclosure is preferably 5% by mass or more and 40% by mass or less, more preferably 8% by mass or more and 30% by mass or less, and even more preferably 10% by mass or more and 20% by mass or less with respect to the total mass of the liquid composition from the viewpoint of abrasion resistance, bendability, and chemical resistance of the obtained cured film.

In addition, it is preferable that a total content Md of a bifunctional (meth)acrylate compound and a total content Mm of a polyfunctional (meth)acrylate compound contained in the liquid composition according to the embodiment of the present disclosure satisfy Md>Mm from the viewpoint of bendability of the obtained cured film.

<Colorant>

In a case where the liquid composition according to the embodiment of the present disclosure is used for applications for an ink composition or the like, the liquid composition may contain a colorant, but it is preferable that the liquid composition does not contain a colorant.

In the present disclosure, the expression "does not contain a colorant" means that a small amount of contamination or the like is allowed, and the liquid composition does not completely contain the colorant or the content of the colorant is more than 0% by mass and 0.1% by mass or less with respect to the total mass of the liquid composition. In addition, the content of the colorant is preferably 0.05% by mass or less and more preferably 0.01% by mass or less with respect to the total mass of the liquid composition.

The colorant is not particularly limited and pigments and oil-soluble dyes which are excellent in weather fastness and rich in color reproducibility are preferable. The colorant can be randomly selected from known colorants such as soluble dyes and used. As the colorant, it is preferable to select a compound which does not function as a polymerization inhibitor from the viewpoint of not lowering the sensitivity of the curing reaction by active radiation.

The pigment is not particularly limited and can be selected appropriately according to the purpose. Examples thereof include known organic pigments and inorganic pigments, and resin particles dyed with a dye, commercially available pigment dispersions, and surface-treated pigments (for example, a dispersion of a pigment in an insoluble resin, or the like, as a dispersion medium, or a pigment having a resin grafted on the surface) may be used. Examples of these pigments include pigments described in, for example, "Pigment Dictionary", edited by Seishiro Ito (2000), "Industrial Organic Pigments" edited by W. Herbst, K. Hunger, JP2002-012607A, JP2002-188025A, JP2003-026978A, and JP2003-342503A.

Examples of the organic pigments and inorganic pigments include yellow pigments, magenta pigments, blue pigments, cyan pigments, green pigments, orange pigments, brown pigments, violet pigments, black pigments and white pigments.

The yellow pigments are pigments exhibiting yellow color, and examples thereof include monoazo pigments such as C.I. Pigment Yellow 1 (Fast Yellow G and the like), and C.I. Pigment Yellow 74, disazo pigments such as C.I. Pigment Yellow 12 (Disazo Yellow and the like), C.I. Pigment Yellow 17, C.I. Pigment Yellow 97, C.I. Pigment Yellow 3, C.I. Pigment Yellow 16, C.I. Pigment Yellow 83, C.I. Pigment Yellow 155, and C.I. Pigment Yellow 219, non-benzidine-based azo pigments such as C.I. Pigment Yellow 180, azo lake pigments such as C.I. Pigment Yellow 100 (Tartrazine Yellow Lake and the like), condensed azo pigments such as C.I. Pigment Yellow 95 (Condensed Azo Yellow and the like), C.I. Pigment Yellow 93, C.I. Pigment Yellow 94, C.I. Pigment Yellow 128, and C.I. Pigment Yellow 166, acidic dye lake pigments such as C.I. Pigment Yellow 115 (Quinoline Yellow Lake and the like), basic dye lake pigments such as C.I. Pigment Yellow 18 (Thioflavine Lake and the like), anthraquinone pigments such as C.I. Pigment Yellow 24 (Flavanthrone Yellow and the like), quinophthalone pigments such as C.I. Pigment Yellow 110 (Quinophthalone Yellow and the like), isoindoline pigments such as C.I. Pigment Yellow 139 (Isoindoline Yellow and the like), pyrazolone pigments such as C.I. Pigment Yellow 60 (Pyrazolone Yellow and the like), acetolone pigments such as C.I. Pigment Yellow 120, C.I. Pigment Yellow 154, C.I. Pigment Yellow 167, C.I. Pigment Yellow 151, C.I. Pigment Yellow 175, C.I. Pigment Yellow 180, C.I. Pigment Yellow 181, C.I. Pigment Yellow 185, and C.I. Pigment Yellow 194, metal complex salt pigments such as C.I. Pigment Yellow 150, nitroso pigments such as C.I. Pigment Yellow 153 (Nickel Nitroso Yellow and the like), and metal complex salt azomethine pigments such as C.I. Pigment Yellow 117 (Copper Azomethine Yellow and the like).

The magenta pigments are pigments exhibiting red or magenta color, and examples thereof include monoazo-based pigments such as C.I. Pigment Red 3 (Toluidine Red and the like), B-naphthol pigments such as C.I. Pigment Red 1, C.I. Pigment Red 4, and C.I. Pigment Red 6, disazo pigments such as C.I. Pigment Red 38 (Pyrazolone Red B and the like), azo lake pigments such as C.I. Pigment Red 53:1 (Lake Red C and the like), C.I. Pigment Red 57:1

(Brilliant Carmine 6B and the like), C.I. Pigment Red 52:1, and C.I. Pigment Red 48 (B-oxynaththoic acid lake and the like), condensed azo pigments such as C.I. Pigment Red 144, C.I. Pigment Red 166, C.I. Pigment Red 220, C.I. Pigment Red 214, C.I. Pigment Red 221, and C.I. Pigment Red 242 (Condensed Azo Red and the like), acid dye lake pigments such as C.I. Pigment Red 174 (Phloxine B Lake and the like), and the C.I. Pigment Red 172 (Erythrosine Lake and the like), basic dye lake pigments such as C.I. Pigment Red 81 (Rhodamine 6G' Lake and the like), anthraquinone-based pigments such as C.I. Pigment Red 177 (Dianthraquiononyl Red and the like), thioindigo pigments such as C.I. Pigment Red 88 (Thioindigo Bordeaux and the like), perinone pigments such as C.I. Pigment Red 194 (Perinone Red and the like), perylene pigments such as C.I. Pigment Red 149, C.I. Pigment Red 179, C.I. Pigment Red 178, C.I. Pigment Red 190, C.I. Pigment Red 224, and C.I. Pigment Red 123, quinacridone pigments such as C.I. Pigment Violet 19 (unsubstituted quinacridone), C.I. Pigment Red 122, C.I. Pigment Red 262, C.I. Pigment Red 207, and C.I. Pigment Red 209, isoindolinone pigments such as C.I. Pigment Red 180 (Isoindolinone Red 2BLT and the like), alizarin lake pigments such as C.I. Pigment Red 83 (Madder Lake and the like), naphtholone pigments such as C.I. Pigment Red 171, C.I. Pigment Red 175, C.I. Pigment Red 176, C.I. Pigment Red 185, and C.I. Pigment Red 208, naphthol AS-based lake pigments such as C.I. Pigment Red 247, naphthol AS pigments such as C.I. Pigment Red 2, C.I. Pigment Red 5, C.I. Pigment Red 21, C.I. Pigment Red 170, C.I. Pigment Red 187, C.I. Pigment Red 256, C.I. Pigment Red 268, and C.I. Pigment Red 269, and diketopyrrolopyrrole pigments such as C.I. Pigment Red 254, C.I. Pigment Red 255, C.I. Pigment Red 264, and C.I. Pigment Red 272.

The cyan pigments are pigments exhibiting blue or cyan color, and examples thereof include disazo-based pigments such as C.I. Pigment Blue 25 (Dianisidine Blue and the like), phthalocyanine pigments such as C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16 (Phthalocyanine Blue and the like), acid dye lake pigments such as C.I. Pigment Blue 24 (Peacock Blue Lake and the like), basic dye lake pigments such as C.I. Pigment Blue 1 (Victoria Pure Blue BO Lake and the like), anthraquinone-based pigments such as C.I. Pigment Blue 60 (Indanthrone Blue and the like), and alkali blue pigments such as C.I. Pigment Blue 18 (Alkali Blue V-5:1).

The green pigments are pigments exhibiting green color, and examples thereof include phthalocyanine pigments such as C.I. Pigment Green 7 (Phthalocyanine Green), and C.I. Pigment Green 36 (Phthalocyanine Green), and azo metal complex pigments such as C.I. Pigment Green 8, and C.I. Pigment Green 10.

The orange pigments are pigment exhibiting orange color, and examples thereof include isoindoline-based pigments such as C.I. Pigment Orange 66 (Isoindoline Orange), anthraquinone-based pigments such as C.I. Pigment Orange 51 (Dichloro Pyranthorone Orange), B-naphthol pigments such as C.I. Pigment Orange 2, C.I. Pigment Orange 3, and C.I. Pigment Orange 5, naphthol AS pigments such as C.I. Pigment Orange 4, C.I. Pigment Orange 22, C.I. Pigment Orange 24, C.I. Pigment Orange 38, and C.I. Pigment Orange 74, isoindolinone pigments such as C.I. Pigment Orange 61, perinone pigments such as C.I. Pigment Orange 43, disazo pigments such as C.I. Pigment Orange 15 and C.I. Pigment Orange 16, quinacridone pigments such as C.I. Pigment Orange 48, and C.I. Pigment Orange 49, acetolone pigments such as C.I. Pigment Orange 36, C.I. Pigment Orange 62, C.I. Pigment Orange 60, C.I. Pigment Orange 64, and C.I. Pigment Orange 72, and Pyrazolone pigments such as C.I. Pigment Orange 13, and C.I. Pigment Orange 34.

The brown pigments are pigments exhibiting brown color, and examples thereof include naphtholone pigments such as C.I. Pigment Brown 25 and C.I. Pigment Brown 32.

The violet pigments are pigments exhibiting purple color, and examples thereof include naphtholone pigments such as C.I. Pigment Violet 32, perylene pigments such as C.I. Pigment Violet 29, naphthol AS pigments such as C.I. Pigment Violet 13, C.I. Pigment Violet 17, and C.I. Pigment Violet 50, and dioxazine pigments such as C.I. Pigment Violet 23 and C.I. Pigment Violet 37.

The black pigments are pigments exhibiting black color, and examples thereof include carbon black such as MOGUL E, titanium black, indazine pigments such as and the C.I. Pigment Black 1 (Aniline Black), and perylene pigments such as C.I. Pigment Black 31, and C.I. Pigment Black 32.

Examples of the white pigments include basic lead carbonate ($2PbCO_3Pb(OH)_2$, a so-called silver white), zinc oxide (ZnO, a so-called zinc white), titanium oxide ($TiO_2$, a so-called titanium white), and strontium titanate ($SrTiO_3$, a so-called a titanium strontium white). Inorganic particles used for a white pigment may be a simple substance, or may be complex particles with oxides of silicon, aluminum, zirconium or titanium, or with organometallic compounds and an organic compound.

Among them, since titanium oxide has a low specific gravity as compared with other white pigments and has a high refractive index, is chemically and physically stable, and is excellent in the covering power and adhesion as a pigment, and further, the durability in acidic, alkaline and other environment, titanium oxide is suitably used. Other white pigments (may be white pigments other than the above white pigments) may be used together with titanium oxide in combination.

For the dispersion of the pigment, for example, dispersion devices such as a ball mill, a sand mill, an attritor, a roll mill, a jet mill, a homogenizer, a paint shaker, a kneader, an agitator, a HENSCHEL mixer, a colloid mill, an ultrasonic homogenizer, a pearl mill, a wet-type jet mill, and the like can be suitably used.

In the present disclosure, a dispersant to be described later is preferably added upon dispersion of the pigment.

In addition, upon dispersion of the pigment, if necessary, a synergist according to various pigments may be added as a dispersion aid. The content of the dispersion aid in the ink composition is preferably 1 part by mass to 50 parts by mass with respect to 100 parts by mass of the pigment.

The dispersion medium used in a case where the pigment is dispersed in the polymerizable composition is not particularly limited and can be appropriately selected according to the purpose. For example, the polymerizable compound with a low molecular weight may be used as the dispersion medium, or a solvent is used as the dispersion medium. However, since the polymerizable composition according to the embodiment of the present disclosure is a radiation curable-type polymerizable composition and, for example, the polymerizable composition is cured after the polymerizable composition is applied onto a recording medium, a solvent-free dispersion medium containing no solvent is preferable. This is because in a case where a solvent remains in the cured product, solvent resistance is deteriorated or problems associated with a volatile organic compound (VOC) of the remaining solvent. Therefore, from the viewpoint of improving the dispersion suitability and handleability of the polymerizable composition, it is preferable that the polymerizable compounds are used as the dispersion medium and that a polymerizable compound with the lowest viscosity is selected from among these polymerizable compounds.

The average particle diameter of the pigment is not particularly limited and can be appropriately selected according to the purpose. However, since the color developability improves with the decrease in particle diameter, the average particle diameter is preferably about 0.01 µm to 0.4 µm and more preferably 0.02 µm to 0.2 µm. In addition, a particle diameter of 3 µm is preferable and 1 µm is more preferable as the maximum particle diameter of the pigment. The particle diameter of the pigment can be adjusted by appropriately selecting the pigment, dispersant, and dispersion medium and by setting appropriate dispersion conditions and filtration conditions. By controlling the particle diameter of the pigment, it is possible to prevent a head of nozzle from clogging and maintain preservation stability of the ink, ink transparency, and curing sensitivity.

The particle diameter of the pigment can be measured by a known measurement method. Specifically, the measurement can be performed by a centrifugal sedimentation light transmission method, an X-ray transmission method, a laser diffraction and scattering method, and a dynamic light scattering method.

The colorant may be used singly or in combination of two or more thereof.

In a case where the liquid composition according to the embodiment of the present disclosure contains the colorant, the content of the colorant in the liquid composition is appropriately selected according to the color and the purpose of use, but is preferably 0.01% by mass to 20% by mass with respect to the total mass of the liquid composition.

<Dispersant>

The liquid composition according to the embodiment of the present disclosure may contain a dispersant. Particularly, in a case of using a pigment, since the pigment is stably dispersed in the ink composition, it is preferable to contain a dispersant. The dispersant is preferably a polymer dispersant. The term "polymer dispersant" in the present disclosure means a dispersant having a weight-average molecular weight of 1,000 or more.

Examples of the polymer dispersant include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie GmbH)); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580, and EFKA7701 (manufactured by EFKA Additives Co., Ltd.); DISPERSE AID 6, DISPERSE AID 8, DISPERSE AID 15, and DISPERSE AID 9100 (manufactured by San Nopco Co., Ltd.); various SOLSPERSE dispersants such as SOLSPERSE 3000, 5000, 9000, 12000, 13240, 13940, 17000, 22000, 24000, 26000, 28000, 32000, 36000, 39000, 41000, and 71000 (manufactured by Noveon, Inc.); ADEKA PLURONIC L31, F38, L42, L44, L61, L64, F68, L72, P95, F77, P84, F87, P94, L101, P103, F108, L121, and P-123 (manufactured by ADEKA Ltd.), IONETTO S-20 (manufactured by Sanyo Chemical Industries, Ltd.); DISPARLON KS-860, 873 SN, and 874 (polymer dispersant), #2150 (aliphatic polycarboxylic acid), and #7004 (polyether ester type) (manufactured by Kusumoto Kasei Co., Ltd.).

The dispersant may be used singly or in combination of two or more thereof.

The content of the dispersant in the liquid composition according to the embodiment of the present disclosure is appropriately selected according to the purpose of use and is preferably 0.05% by mass to 10% by mass with respect to the total mass of the liquid composition.

<Surfactant>

The liquid composition according to the embodiment of the present disclosure may contain a surfactant.

Examples of the surfactant include those described in each of JP1987-173463A (JP-S62-173463A) and JP1987-183457A (JP-S62-183457A). Examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene-polyoxypropylene block copolymers, and cationic surfactants such as alkylamine salts and quaternary ammonium salts. In addition, a fluorine-based surfactant (for example, an organic fluoro compound) or a silicone-based surfactant (for example, a polysiloxane compound) may also be used as the surfactant. It is preferable that the organic fluoro compound is hydrophobic. Examples of the organic fluoro compound include fluorine-based surfactants, oil-like fluorine-based compounds (for example, fluorine oil), and solid-like fluorine compound resins (for example, tetrafluoroethylene resin), and those described in JP1982-009053B (JP-S57-009053B, pages 8 to 17) and JP1987-135826A (JP-S62-135826A) may be mentioned. It is preferable that the polysiloxane compound is a modified polysiloxane compound having an organic group introduced into some of the methyl groups of dimethylpolysiloxane. Examples of the modification include polyether modification, methyl styrene modification, alcohol modification, alkyl modification, aralkyl modification, fatty acid ester modification, epoxy modification, amine modification, amino modification, and mercapto modification. However, the modification is not particularly limited to these. These methods for modification may also be used in combination. In addition, among these, a polyether-modified polysiloxane compound is preferable from the viewpoint of improving jetting stability in ink jetting. Examples of the polyether-modified polysiloxane compound include SILWET L-7604, SILWET L-7607N, SILWET FZ-2104, and SILWET FZ-2161 (manufactured by NUC Corporation), BYK306, BYK307, BYK331, BYK333, BYK347, BYK348, and the like (manufactured by BYK Chemie GmbH), and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among these, a silicone-based surfactant is preferable.

The surfactant may be used singly or in combination of two or more thereof.

The content of the surfactant in the liquid composition according to the embodiment of the present disclosure is appropriately selected according to the purpose of use and is preferably 0.0001% by mass to 1% by mass with respect to the total mass of the liquid composition.

<Other Components>

To the liquid composition according to the embodiment of the present disclosure, in addition to the above-described components, if necessary, known additives such as a polymerization inhibitor, an ultraviolet absorber, an antioxidant, an antifading agent, a surface conditioner, a leveling agent, a matting agent, a wax, an antifoaming agent, a pH adjuster, a charge imparting agent, a disinfectant, a preservative, a deodorant, a charge controlling agent, a wetting agent, an antiskinning agent, a fragrance, and a pigment derivative may be added as an arbitrary component.

The liquid composition according to the embodiment of the present disclosure preferably contains a polymerization inhibitor from the viewpoint of improving storability and suppressing clogging of an ink jet head.

The content of the polymerization inhibitor is preferably 200 ppm to 20,000 ppm with respect to the total mass of the liquid composition.

Examples of the polymerization inhibitor include nitroso-based polymerization inhibitors, hindered amine-based polymerization inhibitors, hydroquinone, benzoquinone, p-methoxy phenol, TEMPO, TEMPOL, and CUPERON Al.

<Physical Properties of Ink Jet Liquid Composition>

The viscosity of the ink jet liquid composition according to the embodiment of the present disclosure at 25° C. is preferably 1 mPa·s to 40 mPa·s, and more preferably 3 mPa·s to 30 mPa·s.

In addition, the viscosity at the jetting temperature (preferably 25° C. to 80° C., more preferably 25° C. to 50° C.) is preferably 1 mPa·s to 30 mPa·s and more preferably 3 mPa·s to 25 mPa·s. The ink composition that can be used in the present disclosure preferably has the compositional ratio appropriately adjusted such that the viscosity is set to be in the above-described ranges. It is possible to inhibit bleeding when a liquid droplet of the liquid composition lands.

The measurement method of the viscosity is not particularly limited; however, preferable examples include a method using a model RE80 viscometer manufactured by Toki Sangyo Co., Ltd. The model RE80 type viscometer is a conical rotor and flat plate type viscometer corresponding to an E-type, and measurement is preferably performed at a rotation speed of 10 rpm using rotor code No. 1 as a rotor. Herein, measurement is preferably performed by changing the rotation speed to 5 rpm, 2.5 rpm, 1 rpm, 0.5 rpm and the like if necessary for those having a high viscosity higher than 60 mPa·s.

In addition, the surface tension of the liquid composition according to the embodiment of the present disclosure at 25° C. is preferably 18 mN/m or more and 50 mN/m or less, and more preferably 20 mN/m or more and 40 mN/m or less from the viewpoint of appropriateness of liquid droplet jetting by the ink jet.

In addition, the surface tension of the liquid composition according to the embodiment of the present disclosure is a value measured at a liquid temperature of 25° C. with the Wilhelmy method using a generally used surface tensiometer (for example, a CBVP-Z surface tensiometer, manufactured by Kyowa Interface Science Co., Ltd, or the like).

(Ink Jet Recording Method)

An ink jet recording method according to an embodiment of the present disclosure includes a step of applying the ink jet liquid composition according to the embodiment of the present disclosure to a base material by an ink jet recording head.

The base material is preferably a base material having an irregular shape in at least a part of the surface and more preferably leather from the viewpoint of further exerting the effects of liquid composition according to the embodiment of the present disclosure.

In the step of the applying, the liquid composition may be directly applied to the base material or a layer such as a decorative layer may be provided to the base material and the liquid composition may be applied to the layer.

The ink jet jetting condition and the jetting amount in the step of the applying are not particularly limited and may be appropriately selected according to the composition and physical properties of the liquid composition to be used, the base material, and the like.

In addition, a printed material according to the embodiment of the present disclosure is a printed material having a cured product obtained by curing the ink jet liquid composition according to the embodiment of the present disclosure, and is preferably a printed material on which recording is performed by the ink jet recording method according to the embodiment of the present disclosure.

In the ink jet recording method according to the embodiment of the present disclosure, an ink jet recording apparatus to be described to be described later in detail can be used.

The ink jet recording apparatus that can be used in the ink jet recording method according to the embodiment of the present disclosure is not particularly limited and, a known ink jet recording apparatus capable of achieving a desired resolution can be arbitrarily selected and used. That is, any ink jet recording apparatus can jet the liquid composition to the base material in the ink jet recording method according to the embodiment of the present disclosure as long as the ink jet recording apparatus is a known ink jet recording apparatus including commercially available products.

Examples of the ink jet recording apparatus according to the embodiment of the present disclosure include apparatuses including ink supply systems, temperature sensors, and active radiation sources.

The ink supply system, for example, is formed of a source tank including the liquid composition according to the embodiment of the present disclosure, a supply pipe, an ink supply tank immediately before the ink jet head, a filter, and a piezo type ink jet head. The piezo type ink jet head can perform driving so as to enable jetting multi-size dots of preferably 1 pl to 100 pl, and more preferably 8 pl to 30 pl at a resolution of preferably 320×320 dpi to 4,000×4,000 dpi, more preferably 400×400 dpi to 1,600×1,600 dpi, and even more preferably 720×720 dpi. The term dpi (dot per inch) used in the present disclosure represents the number of dots per 2.54 cm.

As described above, for the liquid composition according to the embodiment of the present disclosure, since it is preferable that the jetted liquid composition is set to a constant temperature, it is preferable that means for stabilizing the liquid composition temperature is provided in the ink jet recording apparatus. As sites made a constant temperature, all of the pipe system and members from the ink tank (the intermediate tank, in a case where there is an intermediate tank) to the nozzle emission surface become targets. That is, insulation and heating can be performed from the ink supply tank to the ink jet head portion.

The temperature control method is not particularly limited; however, for example, it is preferable to provide a plurality of temperature sensors at sites at each pipe and perform heating control according to the flow rate of the liquid composition and the environmental temperature. The temperature sensors can be provided in the vicinity of the ink supply tank and the nozzles of the ink jet head. In addition, the head unit to be heated is preferably thermally blocked or insulated such that the apparatus main body is not influenced by the temperature from the outside air. In order to shorten the printer startup time required for heating, or in order to reduce the thermal energy loss, it is preferable to provide insulation from other sites and to decrease the heat capacity of the entire heating unit body.

In addition, it is preferable to keep the temperature of the liquid composition during jetting as constant as possible. The control range of the temperature of the liquid composition during jetting is set to preferably ±5° C. of a set temperature, more preferably ±2° C., and even more preferably ±1° C. is appropriate.

In addition, it is preferable that the ink jet recording method according to the embodiment of the present disclosure further includes a step of drying the ink jet liquid composition on the base material by applying heat; and a step of curing the ink jet liquid composition by irradiating the ink jet liquid composition with active radiation.

In the ink jet recording method according to the embodiment of the present disclosure, the liquid composition may be dried by air or may be dried by applying heat, but is preferably dried by applying heat.

The drying temperature in the step of the drying is not particularly limited and may be appropriately set according to the boiling point of the organic solvent in the liquid composition. The base material temperature is preferably 30° C. or higher and 90° C. or lower and more preferably 50° C. or higher and 80° C. or lower.

Next, the irradiation with active radiation will be described.

The dried liquid composition on the base material is cured by being irradiated with active radiation. This is because the polymerization initiator included in the liquid composition according to the embodiment of the present disclosure generates polymerization initiating species, such as radicals by decomposing due to irradiation with active radiation, and the polymerization reaction of the polymerizable compound is started and promoted by the function of the initiating species. At this time, in a case where a sensitizer is present along with a polymerization initiator in the liquid composition, the sensitizer in the system absorbs active radiation and enters an excited state, the decomposition of the polymerization initiator is promoted by the contact with the sensitizer, and a curing reaction with a higher sensitivity can be attained.

Here, the active radiation used can be an α-ray, a γ-ray, an electron beam, an X-ray, an ultraviolet (UV) ray, a visible light or infrared light. The peak wavelength of the active radiation also depends on the absorption characteristics of the sensitizer. However, the peak wavelength is preferably 200 nm to 600 nm, more preferably 300 nm to 450 nm, and even more preferably 320 nm to 420 nm, and the active energy ray is particularly preferably an ultraviolet ray with a peak wavelength in a range of 340 nm to 400 nm.

In addition, the polymerization initiation system of the liquid composition according to the embodiment of the present disclosure has sufficient sensitivity even with a low output active energy ray. Accordingly, curing is suitably performed with an exposure surface illuminance of preferably 10 mW/cm$^2$ to 4,000 mW/cm$^2$, and more preferably 20 mW/cm$^2$ to 2,500 mW/cm$^2$.

As the active radiation source, a mercury lamp, a gas or solid-state laser, or the like is mainly used, and a metal halide lamp is widely known. However, currently, the current move toward becoming mercury free is strongly desired from the viewpoint of environmental protection, and replacement with GaN-based semiconductor ultraviolet light emitting devices is industrially and environmentally extremely effective. Further, LED (UV-LED) and LD (UV-LD) are small size and low cost, and have long service life and high efficiency, and are anticipated as a photocuring type ink jet printer light source.

In addition, it is possible to use light emitting diodes (LED) and laser diodes (LD) as active radiation sources. In particular, in a case where an ultraviolet source is required, an ultraviolet LED and an ultraviolet LD can be used. For example, Nichia Corporation has brought an ultraviolet LED to market having a wavelength with a main emission spectrum between 365 nm and 420 nm. Furthermore, in a case where an even shorter wavelength is needed, the specification of U.S. Pat. No. 6,084,250A discloses an LED capable of emitting active radiation centered between 300 nm and 370 nm. In addition, other ultraviolet LEDs are available and can emit radiation of different ultraviolet ray bands. In the present disclosure, a UV-LED is a particularly preferable active energy ray source, and particularly preferable is a UV-LED having a peak wavelength of 340 nm to 400 nm.

In addition, the maximum illuminance on the recording medium of the LED is preferably 10 mW/cm$^2$ to 2,000 mW/cm$^2$, more preferably 20 mW/cm$^2$ to 1,000 mW/cm$^2$, and particularly preferably 50 mW/cm$^2$ to 800 mW/cm$^2$.

The liquid composition according to the embodiment of the present disclosure is suitably irradiated with such active radiation for preferably 0.01 seconds to 120 seconds and more preferably 0.1 seconds to 90 seconds.

The irradiation conditions of the active radiation and the basic irradiation method are disclosed in JP1985-132767A (JP-S60-132767A).

Further, curing may be completed using another light source that is not driven. WO99/54415A as an irradiation method, a method using an optical fiber, and a method of directing a collimated light source to a mirror surface, which is provided on the side surface of a head unit, to irradiate a recorded area with UV light. The above-described curing methods can be applied to the ink jet recording method according to the embodiment of the present disclosure.

Among these, as the ink jet recording method according to the embodiment of the present disclosure, an ink jet recording method including a step of preparing a base material having a decorative layer formed thereon, a step of applying the ink jet liquid composition according to the embodiment of the present disclosure not containing a colorant to the decorative layer by an ink jet recording head, a step of drying the ink jet liquid composition on the decorative layer by applying heat, and a step of curing the ink jet liquid composition by irradiating the ink jet liquid composition with an ultraviolet ray, in which the base material having the decorative layer formed thereon has an irregular shape in at least a part of a surface is preferably used.

The decorative layer may be formed using the liquid composition according to the embodiment of the present disclosure as a coloring ink composition or may be formed using a known ink composition.

By forming an overcoat on the decorative layer using the liquid composition according to the embodiment of the present disclosure, even in a case where a known ink composition is used, abrasion resistance, bendability, and chemical resistance are excellent.

As the base material, not only a base material having an irregular shape in at least a part of the surface of the above-mentioned leather or the like, but also papers such as ordinary uncoated paper and coated paper, various nonabsorbent resin materials used for so-called soft packaging and resin films formed by molding the resins materials in a film form can also be used.

Examples of the various plastic films include a polyethylene terephthalate (PET) film, a biaxially oriented polystyrene (OPS) film, a biaxially oriented polypropylene (OPP) film, a biaxially oriented nylon (ONy) film, a polyvinyl chloride (PVC) film, a polyethylene (PE) film, and a cellulose triacetate (TAC) film.

In addition, examples of plastics that can be used as the base material include polycarbonate, an acrylic resin, an acrylonitrile-butadiene-styrene (ABS) copolymer, polyacetal, polyvinyl alcohol (PVA), and rubbers. Further, metals and glasses can be used as the recording medium.

EXAMPLES

Hereinafter, the present invention will be more specifically described based on examples, but the present disclosure is not limited to the examples. Herein, unless otherwise specified, "part" and "%" are based on mass.

Hereinafter, the details of various components used in Examples and Comparative Examples are shown.

Cyan pigment (PB15:4, C.I. Pigment Blue 15:4, HELIO-GEN BLUE D 7110 F, manufactured by BASF SE)

Magenta pigment (mixed quinacridone, CINQUASIA MAGENTA L 4540, manufactured by BASF SE)

Yellow pigment (PY155, C.I. Pigment Yellow 155, INK JET YELLOW 4GC, manufactured by Clarinat)

Black pigment (carbon black, MOGUL E, manufactured by CABOT) Dispersant (Sol32000, SOLSPERSE 32000, manufactured by The Lubrizol Corporation)

The details of the organic solvents used in Examples and Comparative Examples are shown in Table 1.

TABLE 1

| Compound name | Boiling point (° C.) | Manufacturer |
| --- | --- | --- |
| Ethylene glycol monomethyl ether (EGMME) | 125 | Tokyo Chemical Industry Co., Ltd. |
| 3-Methoxybutyl acetate | 172 | Tokyo Chemical Industry Co., Ltd. |
| Diethylene glycol dimethyl ether (DEGDEE) | 188 | Tokyo Chemical Industry Co., Ltd. |
| Triethylene glycol monobutyl ether (TEGMBE) | 278 | Tokyo Chemical Industry Co., Ltd. |

The details of the urethane (meth)acrylate oligomers (oligomers) used in Examples and Comparative Examples are shown in Table 2.

TABLE 2

| Trade name | Manufacturer | Functional number | Mw |
| --- | --- | --- | --- |
| Photomer 4184 | IGM Resins | Monofunctional | 215 |
| UA-122P | Shin-Nakamura Chemical Co., Ltd. | Bifunctional | 1,100 |
| SHIKO UV-6630B | The Nippon Synthetic Chemical Industry Co., Ltd. | Bifunctional | 3,000 |
| SHIKO UV-3310B | The Nippon Synthetic Chemical Industry Co., Ltd. | Bifunctional | 5,000 |
| SHIKO UV-3300B | The Nippon Synthetic Chemical Industry Co., Ltd. | Bifunctional | 13,000 |
| SHIKO UV-3000B | The Nippon Synthetic Chemical Industry Co., Ltd. | Bifunctional | 18,000 |
| SHIKO UV-7550B | The Nippon Synthetic Chemical Industry Co., Ltd. | Trifunctional | 2,400 |
| SHIKO UV-7600B | The Nippon Synthetic Chemical Industry Co., Ltd. | Hexafunctional | 1,400 |
| SHIKO UV-7630B | The Nippon Synthetic Chemical Industry Co., Ltd. | Hexafunctional | 2,200 |
| CN9001 | Sartomer Company Inc. | Bifunctional | 3,250 |

The details of the vinyl chloride-vinyl acetate copolymers (specific copolymers) used in Examples and Comparative Examples are shown in Table 3.

TABLE 3

| Vinyl chloride-vinyl acetate copolymer | Vinyl chloride (% by mass) | Vinyl acetate (% by mass) | Mw | Manufacturer |
| --- | --- | --- | --- | --- |
| vinnol H15/42 | 86 | 14 | 18,800 | Wacker Chemie AG |
| vinnol H14/36 | 85.6 | 14.4 | 16,000 | Wacker Chemie AG |
| vinnol H11/59 | 90.5 | 9.5 | 43,000 | Wacker Chemie AG |

Silicone acrylic resin (CHALINE 175, silicone resin grafted with acrylic resin chain, manufactured by Nissin Chemical Industry Co., Ltd.)

Polymerization inhibitor (UV-22, Irgastab (registered trademark) UV-22, Poly[oxy(methyl-1,2-ethanediyl)]-α,α', α"-1,2,3-propanetriyltris[-[(1-oxo-2-propen-1-yl)oxy]-2,6-bis(1,1-dimethylethyl)-4-(phenylenemethylene)cyclohexa-2,5-dien-1-one], manufactured by BASF SE)

Photopolymerization initiator (Irg819, bis(2,4,6-trimethylbenzoyl)phenylphosphine oxide, IRGACURE (registered trademark) 819, manufactured by BASF SE)

Photopolymerization initiator (Irg2959, 1-[4-(2-hydroxyethoxy)phenyl]-2-hydroxy-2-methyl-1-propane-1-one, IRGACURE (registered trademark) 2959, manufactured by BASF SE)

Surfactant (BYK 331, polyether-modified polydimethylsiloxane, manufactured by BYK Chemie)

Monomer (PEA, 2-phenoxyethyl acrylate, SR339C, manufactured by Sartomer Company Inc.)

Acrylic resin (BR113, DIANAL BR113, manufactured by MITSUBISHI RAYON CO., LTD.)

Polyester resin (LTH, TEGO AddBond LTH, manufactured by Evonik Industries AG)

<Preparation of Pigment Dispersion>

The compositions other than the pigments shown in Table 4 were mixed and stirred (10 to 15 minutes, 2,000 to 3,000 rpm/min) with a mixer manufactured by SILVERSON Co., Ltd. to obtain a uniform transparent liquid (diluted solution of dispersant). The pigments were added to the transparent liquid (diluted solution of dispersant), and further stirred with the mixer (10 to 20 minutes, 2,000 to 3,000 rpm/min) to obtain 500 parts of a uniform preliminary dispersion liquid. Thereafter, a dispersion process was performed using a circulation bead mill device (SL-012C1) manufactured by EIGER Corp. Dispersion was performed under dispersion conditions in which 200 parts of zirconia beads with a diameter of 0.65 mm were charged, and the circumferential speed was set to 15 m/s. The dispersion time was set to 1 to 6 hours.

TABLE 4

| | Cyan pigment mill base | Magenta pigment mill base | Yellow pigment mill base | Black pigment mill base |
| --- | --- | --- | --- | --- |
| Pigment | PB15:4 30% by mass | Mixed quinacridone 30% by mass | PY155 30% by mass | Carbon black 30% by mass |

TABLE 4-continued

|  | Cyan pigment mill base | Magenta pigment mill base | Yellow pigment mill base | Black pigment mill base |
|---|---|---|---|---|
| Dispersant | Sol32000 10% by mass | Sol32000 15% by mass | Sol32000 10% by mass | Sol32000 10% by mass |
| DEGDEE | 60% by mass | 55% by mass | 60% by mass | 60% by mass |

<Preparation of Ink Jet Liquid Composition>

Each compound and the like were mixed at the composition in each table shown below and stirred (10 to 15 minutes, 2,000 to 3,000 rpm/min), with a mixer manufactured by SILVERSON Co., Ltd., to obtain a uniform ink jet liquid composition.

<Ink Jet Recording Method>

To an ink jet printer (KEGON) manufactured by Afit Corporation, a rubber heater (SR100, manufactured by ThreeHigh Co., Ltd.) and an ultraviolet (UV) irradiation apparatus (Vzero, manufactured by Integration Technology) were attached. The output of the rubber heater was set such that the temperature of the base material could be increased to about 60° C. In addition, the time from ink jet jetting to UV exposure corresponded to the drying time of the liquid droplet and the transfer speed (5 m/min to 25 m/min) and the timing of opening or closing the UV shutter were adjusted such that the time was set to 10 seconds.

Printing was carried out with the configuration of two patterns. Each configuration is as shown below.

—Printing of Pattern 1 (Single Layer)—

A liquid composition A was jetted from the ink jet head and a decorative layer was formed on a base material PVC leather (CUPPUCCINO CP-830, manufactured by YAMAPLAS CO., LTD., polyvinyl chloride synthetic leather, L2/L1=1.21). At this time, the image density was set to 1,200 dpi×600 dpi, and the amount (all-color total amount) of the liquid composition A applied to the base material was set to 20 g/m$^2$.

—Printing of Pattern 2 (Two Layers)—

The liquid composition A was jetted from the ink jet head and a decorative layer was formed on a base material PVC leather (CUPPUCCINO CP-830, manufactured by YAMAPLAS CO., LTD., polyvinyl chloride synthetic leather, L2/L1=1.21). At this time, the image density was set to 1,200 dpi×600 dpi, and the amount (all-color total amount) of the liquid composition A applied to the base material was set to 20 g/m$^2$.

A liquid composition B was jetted to the decorative layer from the ink jet head to form a protective layer. At this time, the image density was set to 1,200 dpi×600 dpi, and the amount of the liquid composition B applied to the base material was set to 10 g/m$^2$.

1. Printing of Pattern 1 by Coloring Liquid Composition

Each liquid composition shown in Tables 5 and 6 was introduced into the ink jet printer and printing of Pattern 1 was performed. As the liquid composition A, a set of liquid compositions C1, M1, Y1, and K1 shown in Table 5 or a set of liquid composition C2, M2, Y2, and K2 shown in Table 6 was used.

A rectangular solid image of each color of a size of 20×12 cm was printed to form a cured image. The cured image was evaluated for coverage, abrasion resistance, bendability, chemical resistance, and ink jet jetting stability according to the evaluation standards described below. The evaluation results are collectively shown in Table 5 or Table 6.

<Evaluation>

(Coverage (Film Uniformity))

A reflection density D1 when printing was performed on a white polyethylene terephthalate (PET) (brand No. 339, manufactured by TEIJIN FILM SOLUTIONS LIMITED) as a reference base material L2/L1=1 was compared with a reflection density D2 when printing was performed on a target base material (the above base material PVC leather or a base material in Table 14 shown later) to define coverage. The reflection density was measured using a colorimeter (SPM100-II, manufactured by Gretag Corp.) and in order to avoid the influence of light scattering due to unevenness on the surface, water and slide glass (trade name S1111, manufactured by Matsunami Glass Industry Co., Ltd.) were placed on a measurement sample and measurement was performed.

—Evaluation Standards of Coverage (Film Uniformity)—

5 points: D2/D1 is 0.80 or more.
4 points: D2/D1 is less than 0.80 and 0.75 or more.
3 points: D2/D1 is less than 0.75 and 0.70 or more.
2 points: D2/D1 is less than 0.70 and 0.65 or more.
1 point: D2/D1 is less than 0.65.

(Abrasion Resistance)

Using a gakushin type tester (manufactured by Suga Test Instruments Co., Ltd.), a certain number of times of abrasion was carried out on the above cured image while applying a load of 200 g by dried cotton (white cloth for test: cotton (Kanakin No. 3, purchased from Japan Standard Association)). During this period, the number of times of abrasion until scratches were visually recognized on the base material was recorded and abrasion resistance was evaluated according to the following evaluation standards. Three or more points in the following evaluation standards are considered as a pass.

—Evaluation Standards of Abrasion Resistance—

5 points: No scratches were generated even at 2,000 times of abrasion.
4 points: Scratches were generated at 1,000 times or more and less than 2,000 times of abrasion.
3 points: Scratches were generated at 500 times or more and less than 1,000 times of abrasion.
2 points: Scratches were generated at 100 times or more and less than 500 of abrasion.
1 point: Scratches were generated at less than 100 times of abrasion.

(Bendability)

Using a bending tester (Flexiometer, manufactured by Yasuda Seiki Seisakusho, Ltd.), a certain number of times of bending was performed on the base material on which the cured image was formed. During this period, the number of times until cracks were visually recognized in the cured image was recorded and bendability was evaluated according to the following evaluation standards. Three or more points in the following evaluation standards are considered as a pass.

—Evaluation Standards of Bendability—

5 points: No cracks were generated even at 20,000 times of bending.
4 points: Cracks were generated at 10,000 times or more and less than 20,000 times of bending.
3 points: Cracks were generated at 5,000 times or more and less than 10,000 of bending.
2 points: Cracks were generated at 1,000 times or more and less than 5,000 times of bending.
1 point: Cracks were generated at less than 1,000 of times of bending.

(Chemical Resistance)

Using a gakushin type tester (manufactured by Suga Test Instruments Co., Ltd.), a certain number of times of abrasion was carried out on the above cured image, while applying a load of 400 g by cotton impregnated with ethanol (white cloth for test: cotton (Kanakin No. 3, purchased from Japan Standard Association)). During this period, the number of times until scratches were visually recognized on the surface of the base material was recorded and chemical resistance was evaluated according to the following evaluation standards. Three or more points in the following evaluation standards are considered as a pass.

—Evaluation Standards of Chemical Resistance—

5 points: No scratches were generated on the surface of the base material even at 200 times of abrasion.

4 points: Scratches were generated on the surface of the base material at 100 times or more and less than 200 times of abrasion.

3 points: Scratches were generated on the surface of the base material at 50 times or more and less than 100 times of abrasion.

2 points: Scratches were generated on the surface of the base material at 10 times or more and less than 50 of abrasion.

1 point: Scratches were generated on the surface of the base material at less than 10 times of abrasion.

(Ink Jet (IJ) Jetting Stability)

Under the same solid image printing conditions except that the base material was changed to an A3 size recording sheet (GASAI, ink jet photographic printing paper, manufactured by Fujifilm Corporation), continuous solid image printing was performed on 40 recording sheet. Hereinafter, a recording sheet on which a solid image is printed is referred to as a "sample". 40 samples were visually observed and the number of samples in which nozzle missing (that is, an image defect due to nozzle jetting failure) was confirmed in the solid image was examined. Based on this result, ink jet jetting stability was evaluated according to the following evaluation standards. Three or more points in the following evaluation standards are considered as a pass.

—Evaluation Standards of Ink Jet Jetting Stability—

5 points: Number of samples in which nozzle missing is confirmed is 0.

4 points: Number of samples in which nozzle missing is confirmed is 1.

3 points: Number of samples in which nozzle missing is confirmed is 2.

2 points: Number of samples in which nozzle missing is confirmed is 3.

1 point: Number of samples in which nozzle missing is confirmed is 4 or more.

TABLE 5

| | | Example 1 C1 | Example 2 M1 | Example 3 Y1 | Example 4 K1 |
|---|---|---|---|---|---|
| Organic solvent | 3-Methoxybutyl Acetate | 71.6 | 66.4 | 67.6 | 70.1 |
| Oligomer | CN9001 | 12 | 12 | 12 | 12 |
| | SHIKO UV-7600B | 3 | 3 | 3 | 3 |
| Specific copolymer | vinnol H14/36 | 3 | 3 | 3 | 3 |
| Silicone acrylic resin | CHALINE 175 | 0.3 | 0.3 | 0.3 | 0.3 |
| Polymerization inhibitor | UV22 | 1 | 1 | 1 | 1 |
| Photopolymerization initiator | Irg819 | 2 | 2 | 2 | 2 |
| | Irg2959 | 1 | 1 | 1 | 1 |
| Surfactant | BYK 331 | 0.1 | 0.1 | 0.1 | 0.1 |
| Cyan pigment mill base | | 6 | — | — | — |
| Magenta pigment mill base | | — | 11.2 | — | — |
| Yellow pigment mill base | | — | — | 10 | — |
| Black pigment mill base | | — | — | — | 7.5 |
| Content of organopolysiloxane compound (ratio with respect to total weight polymerizable compound and specific copolymer) | | 1.7% | 1.7% | 1.7% | 1.7% |
| Mc/Mp | | 0.20 | 0.20 | 0.20 | 0.20 |
| Ratio of Mp + Mc with respect to total mass of liquid composition | | 18% | 18% | 18% | 18% |
| Evaluation | Coverage | 5 | 5 | 5 | 5 |
| | Abrasion resistance | 5 | 5 | 5 | 5 |
| | Bendability | 5 | 5 | 5 | 5 |
| | Chemical resistance | 5 | 5 | 5 | 5 |
| | IJ jetting stability | 5 | 5 | 5 | 5 |

TABLE 6

| | | Comparative Example 1 C2 | Comparative Example 2 M2 | Comparative Example 3 Y2 | Comparative Example 4 K2 |
|---|---|---|---|---|---|
| Organic solvent | 3-Methoxybutyl Acetate | 74.9 | 69.7 | 70.9 | 73.4 |
| Oligomer | CN9001 | 8 | 8 | 8 | 8 |
| | SHIKO UV-7600B | 7 | 7 | 7 | 7 |

TABLE 6-continued

|  |  | Comparative Example 1 C2 | Comparative Example 2 M2 | Comparative Example 3 Y2 | Comparative Example 4 K2 |
|---|---|---|---|---|---|
| Polymerization inhibitor | UV22 | 1 | 1 | 1 | 1 |
| Photopolymerization initiator | Irg819 | 2 | 2 | 2 | 2 |
|  | Irg2959 | 1 | 1 | 1 | 1 |
| Surfactant | BYK 331 | 0.1 | 0.1 | 0.1 | 0.1 |
| Cyan pigment mill base |  | 6 | — | — | — |
| Magenta pigment mill base |  | — | 11.2 | — | — |
| Yellow pigment mill base |  | — | — | 10 | — |
| Black pigment mill base |  | — | — | — | 7.5 |
| Evaluation | Coverage | 1 | 1 | 1 | 1 |
|  | Abrasion resistance | 1 | 1 | 1 | 1 |
|  | Bendability | 5 | 5 | 5 | 5 |
|  | Chemical resistance | 1 | 1 | 1 | 1 |
|  | IJ jetting stability | 5 | 5 | 5 | 5 |

As clearly seen from the results in Tables 5 and 6, it is found that in a case of using the ink jet liquid composition according to the embodiment of the present disclosure, and even in a case of using a base material having an irregular shape as a base material, the film uniformity, abrasion resistance, bendability, and chemical resistance of the obtained cured film are excellent.

2. Printing of Pattern 2 with Transparent Liquid Composition

Each liquid composition in Tables 7 to 12 was introduced into the ink jet printer and printing of Pattern 2 was performed. As the liquid composition A, a set of liquid composition C2, M2, Y2, and K2 shown in Table 6 was used. A yellow solid image of a size of 20×12 cm was printed and a base material having a decorative layer formed thereon was prepared. A protective layer was formed on the decorative layer by using T1 to T34 shown in Tables 7 to 12 as the liquid composition B. With respect to each of the prepared samples, the coverage, the abrasion resistance, the bendability, the chemical resistance, and the ink jet jetting stability were evaluated based on the evaluation standards.

In order to form the protective layer in the samples used for measurement of coverage, separately, compounds obtained by adding 1 part by mass of the cyan pigment mill base with respect to 100 parts by mass of the transparent liquid compositions T1 to T34 shown in Tables 7 to 12 were used.

The evaluation results were collectively shown in Tables 7 to 12.

TABLE 7

|  |  | Example 5 T1 | Comparative Example 5 T2 | Comparative Example 6 T3 | Example 6 T4 | Comparative Example 7 T5 | Example 7 T6 |
|---|---|---|---|---|---|---|---|
| Solvent | 3-Methoxybutyl Acetate | 78.7 | 80.7 | 35 | 50 | 92 | 85 |
| Oligomer | SHIKO UV-3310B | 13 | 13 | 13 | 13 | 1 | 5 |
|  | SHIKO UV-7630B | 2 | 2 | 2 | 2 | 0.7 | 3.7 |
| Monomer | PEA | 0 | 0 | 43.7 | 28.7 | 0 | 0 |
| Specific copolymer | vinnol H14/36 | 2 | 0 | 2 | 2 | 2 | 2 |
| Silicone acrylic resin | CHALINE 175 | 0.3 | 0.3 | 0.3 | 0.3 | 0.3 | 0.3 |
| Polymerization inhibitor | UV22 | 1 | 1 | 1 | 1 | 1 | 1 |
| Photopolymerization initiator | Irg819 | 2 | 2 | 2 | 2 | 2 | 2 |
|  | Irg2959 | 1 | 1 | 1 | 1 | 1 | 1 |
| Mc/Mp |  | 0.13 | 0.00 | 0.03 | 0.05 | 1.18 | 0.23 |
| Ratio of Mp + Mc with respect to total mass of liquid composition |  | 17% | 15% | 61% | 46% | 4% | 11% |
| Evaluation | Coverage | 5 | 1 | 2 | 3 | 2 | 3 |
|  | Abrasion resistance | 5 | 1 | 2 | 3 | 1 | 3 |
|  | Bendability | 5 | 5 | 1 | 3 | 5 | 5 |
|  | Chemical resistance | 5 | 1 | 2 | 3 | 1 | 3 |
|  | IJ jetting stability | 5 | 5 | 5 | 5 | 5 | 5 |

TABLE 8

|  |  | Example 5 T1 | Comparative Example 8 T7 | Comparative Example 9 T8 | Comparative Example 10 T9 | Example 8 T10 | Comparative Example 11 T11 | Example 9 T12 |
|---|---|---|---|---|---|---|---|---|
| Organic solvent | 3-Methoxybutyl Acetate | 78.7 | 78.7 | 78.7 | 78.7 | 78.7 | 78.7 | 78.7 |
| Oligomer | SHIKO UV-3310B | 13 | 0 | 0 | 0 | 0 | 0 | 0 |
|  | SHIKO UV-7550B | 0 | 13 | 0 | 0 | 0 | 0 | 0 |
|  | Photomer4184 | 0 | 0 | 13 | 0 | 0 | 0 | 0 |
|  | UA-122P | 0 | 0 | 0 | 13 | 0 | 0 | 0 |
|  | SHIKO UV-6630B | 0 | 0 | 0 | 0 | 13 | 0 | 0 |
|  | SHIKO UV-3000B | 0 | 0 | 0 | 0 | 0 | 13 | 0 |
|  | SHIKO UV-3300B | 0 | 0 | 0 | 0 | 0 | 0 | 13 |
|  | SHIKO UV-7630B | 2 | 2 | 2 | 2 | 2 | 2 | 2 |
| Specific copolymer | vinnol H14/36 | 2 | 2 | 2 | 2 | 2 | 2 | 2 |
| Silicone acrylic resin | CHALINE 175 | 0.3 | 0.3 | 0.3 | 0.3 | 0.3 | 0.3 | 0.3 |
| Polymerization inhibitor | UV22 | 1 | 1 | 1 | 1 | 1 | 1 | 1 |
| Photopolymerization initiator | Irg819 | 2 | 2 | 2 | 2 | 2 | 2 | 2 |
|  | Irg2959 | 1 | 1 | 1 | 1 | 1 | 1 | 1 |
| Mc/Mp |  | 0.13 | 0.13 | 0.13 | 0.13 | 0.13 | 0.13 | 0.13 |
| Ratio of Mp + Mc with respect to total mass of liquid composition |  | 17% | 17% | 17% | 17% | 17% | 17% | 17% |
| Evaluation | Coverage | 5 | 5 | 1 | 3 | 4 | 5 | 5 |
|  | Abrasion resistance | 5 | 5 | 1 | 3 | 4 | 2 | 4 |
|  | Bendability | 5 | 1 | 5 | 2 | 3 | 5 | 5 |
|  | Chemical resistance | 5 | 5 | 1 | 3 | 4 | 2 | 4 |
|  | IJ jetting stability | 5 | 5 | 5 | 5 | 5 | 2 | 3 |

TABLE 9

|  |  | Example 5 T1 | Example 10 T13 | Example 11 T14 | Comparative Example 12 T15 | Comparative Example 13 T16 | Example 12 TI7 | Example 13 T18 |
|---|---|---|---|---|---|---|---|---|
| Organic solvent | 3-Methoxybutyl Acetate | 78.7 | 78.7 | 78.7 | 78.7 | 78.7 | 78.7 | 78.7 |
| Oligomer | SHIKO UV-3310B | 13 | 13 | 13 | 13 | 13 | 8 | 7 |
|  | SHIKO UV-7630B | 2 | 2 | 2 | 2 | 2 | 7 | 8 |
| Monomer | PEA | 0 | 0 | 0 | 0 | 0 | 0 | 0 |
| Specific copolymer | vinnol H14/36 | 2 | 0 | 0 | 0 | 0 | 2 | 2 |
|  | vinnol H11/59 | 0 | 2 | 0 | 0 | 0 | 0 | 0 |
|  | vinnol H15/42 | 0 | 0 | 2 | 0 | 0 | 0 | 0 |
| Acrylic resin | BR113 | 0 | 0 | 0 | 2 | 0 | 0 | 0 |
| Polyester resin | LTH | 0 | 0 | 0 | 0 | 2 | 0 | 0 |
| Silicone acrylic resin | CHALINE 175 | 0.3 | 0.3 | 0.3 | 0.3 | 0.3 | 0.3 | 0.3 |
| Polymerization inhibitor | UV22 | 1 | 1 | 1 | 1 | 1 | 1 | 1 |
| Photopolymerization initiator | Irg819 | 2 | 2 | 2 | 2 | 2 | 2 | 2 |
|  | Irg2959 | 1 | 1 | 1 | 1 | 1 | 1 | 1 |
| Mc/Mp |  | 0.13 | 0.13 | 0.13 | 0.00 | 0.00 | 0.13 | 0.13 |
| Ratio of Mp + Mc with respect to total mass of liquid composition |  | 17% | 17% | 17% | 15% | 15% | 17% | 17% |
| Evaluation | Coverage | 5 | 5 | 5 | 2 | 2 | 5 | 5 |
|  | Abrasion resistance | 5 | 5 | 5 | 2 | 2 | 5 | 5 |
|  | Bendability | 5 | 5 | 5 | 5 | 5 | 5 | 3 |
|  | Chemical resistance | 5 | 5 | 5 | 1 | 1 | 5 | 5 |
|  | IJ jetting stability | 5 | 3 | 4 | 4 | 4 | 5 | 5 |

TABLE 10

|  |  | Example 5 T1 | Example 14 T19 | Example 15 T20 | Example 16 T21 | Example 17 T22 | Example 18 T23 | Example 19 T24 | Example 20 T25 | Example 21 T26 |
|---|---|---|---|---|---|---|---|---|---|---|
| Organic solvent | 3-Methoxybutyl Acetate | 78.7 | 78.7 | 78.7 | 78.7 | 78.7 | 87.2 | 89.9 | 70.2 | 61.7 |
| Oligomer | SHIKO UV-3310B | 13 | 11.5 | 10 | 13.5 | 14.5 | 6.5 | 4.3 | 19.5 | 26 |
|  | SHIKO UV-7630B | 2 | 2 | 2 | 2 | 2 | 1 | 0.9 | 3 | 4 |

TABLE 10-continued

|  |  | Example 5 T1 | Example 14 T19 | Example 15 T20 | Example 16 T21 | Example 17 T22 | Example 18 T23 | Example 19 T24 | Example 20 T25 | Example 21 T26 |
|---|---|---|---|---|---|---|---|---|---|---|
| Monomer | PEA | 0 | 0 | 0 | 0 | 0 | 0 | 0 | 0 | 0 |
| Specific copolymer | vinnol H14/36 | 2 | 3.5 | 5 | 1.5 | 0.5 | 1 | 0.6 | 3 | 4 |
| Silicone acrylic resin | CHALINE 175 | 0.3 | 0.3 | 0.3 | 0.3 | 0.3 | 0.3 | 0.3 | 0.3 | 0.3 |
| Polymerization inhibitor | UV22 | 1 | 1 | 1 | 1 | 1 | 1 | 1 | 1 | 1 |
| Photopolymerization initiator | Irg819 | 2 | 2 | 2 | 2 | 2 | 2 | 2 | 2 | 2 |
|  | Irg2959 | 1 | 1 | 1 | 1 | 1 | 1 | 1 | 1 | 1 |
| Mc/Mp |  | 0.13 | 0.26 | 0.42 | 0.10 | 0.03 | 0.13 | 0.12 | 0.13 | 0.13 |
| Ratio of Mp + Mc with respect to total mass of liquid composition |  | 17% | 17% | 17% | 17% | 17% | 9% | 6% | 26% | 34% |
| Evaluation | Coverage | 5 | 5 | 5 | 5 | 5 | 4 | 3 | 5 | 5 |
|  | Abrasion resistance | 5 | 4 | 3 | 5 | 5 | 4 | 3 | 5 | 5 |
|  | Bendability | 5 | 5 | 5 | 4 | 3 | 5 | 5 | 4 | 3 |
|  | Chemical resistance | 5 | 5 | 5 | 4 | 3 | 4 | 3 | 5 | 5 |
|  | IJ jetting stability | 5 | 4 | 3 | 5 | 5 | 5 | 5 | 4 | 3 |

TABLE 11

|  |  | Example 22 T27 | Example 23 T28 | Example 24 T29 | Example 25 T30 | Example 26 T31 |
|---|---|---|---|---|---|---|
| Organic solvent | 3-Methoxybutyl Acetate | 78.7 | 78.8 | 78 | 77.4 | 76 |
| Oligomer | CN9001 | 8 | 8 | 8 | 8 | 8 |
|  | SHIKO UV-7600B | 7 | 7 | 7 | 7 | 7 |
| Specific copolymer | vinnol H14/36 | 2 | 2 | 2 | 2 | 2 |
| Silicone acrylic resin | CHALINE 175 | 0.3 | 0.2 | 1 | 1.6 | 3 |
| Polymerization inhibitor | UV22 | 1 | 1 | 1 | 1 | 1 |
| Photopolymerization initiator | Irg819 | 2 | 2 | 2 | 2 | 2 |
|  | Irg2959 | 1 | 1 | 1 | 1 | 1 |
| Content of organopolysiloxane compound (ratio with respect to total weight polymerizable compound and specific copolymer) |  | 1.8% | 1.2% | 5.9% | 9.4% | 17.6% |
| Mc/Mp |  | 0.13 | 0.13 | 0.13 | 0.13 | 0.13 |
| Ratio of Mp + Mc with respect to total mass of liquid composition |  | 17% | 17% | 17% | 17% | 17% |
| Evaluation | Coverage | 5 | 5 | 5 | 5 | 5 |
|  | Abrasion resistance | 5 | 3 | 5 | 5 | 5 |
|  | Bendability | 5 | 5 | 5 | 5 | 5 |
|  | Chemical resistance | 5 | 3 | 5 | 5 | 5 |
|  | IJ jetting stability | 5 | 5 | 5 | 4 | 3 |

TABLE 12

|  |  | Example 22 T27 | Example 27 T32 | Example 28 T33 | Example 29 T34 |
|---|---|---|---|---|---|
| Organic solvent | 3-Methoxybutyl Acetate | 78.7 | 0 | 0 | 0 |
|  | TEGMBE | 0 | 78.7 | 0 | 0 |
|  | DEGDEE | 0 | 0 | 78.7 | 0 |
|  | EGMME | 0 | 0 | 0 | 78.7 |
| Oligomer | CN9001 | 8 | 8 | 8 | 8 |
|  | SHIKO UV-7600B | 7 | 7 | 7 | 7 |
| Specific copolymer | vinnol H14/36 | 2 | 2 | 2 | 2 |
| Silicone acrylic resin | CHALINE 175 | 0.3 | 0.3 | 0.3 | 0.3 |
| Polymerization inhibitor | UV22 | 1 | 1 | 1 | 1 |
| Photopolymerization initiator | Irg819 | 2 | 2 | 2 | 2 |
|  | Irg2959 | 1 | 1 | 1 | 1 |
| Content of organopolysiloxane compound (ratio |  |  |  |  |  |

TABLE 12-continued

|  |  | Example 22 T27 | Example 27 T32 | Example 28 T33 | Example 29 T34 |
|---|---|---|---|---|---|
| with respect to total weight polymerizable compound and specific copolymer) | | 1.8% | 1.8% | 1.8% | 1.8% |
| Mc/Mp | | 0.13 | 0.13 | 0.13 | 0.13 |
| Ratio of Mp + Mc with respect to total mass of liquid composition | | 17% | 17% | 17% | 17% |
| Evaluation | Coverage | 5 | 5 | 5 | 3 |
|  | Abrasion resistance | 5 | 5 | 5 | 3 |
|  | Bendability | 5 | 5 | 5 | 5 |
|  | Chemical resistance | 5 | 5 | 5 | 3 |
|  | IJ jetting stability | 5 | 3 | 5 | 5 |

As clearly seen from the results in Tables 7 to 12, it is found that in a case of using the ink jet liquid composition according to the embodiment of the present disclosure, and even in a case of using a base material having an irregular shape as a base material, the coating uniformity, abrasion resistance, bendability, and chemical resistance of the obtained cured film are excellent.

In addition, as shown in Examples 5 to 7 in Table 7, in a case where the content of the organic solvent is 60% by mass or more and 83% by mass or less with respect to the total mass of the liquid composition, the film uniformity, abrasion resistance, bendability, and chemical resistance of the obtained cured film are further excellent.

As shown in Examples 5, 8, and 9 in Table 8, in a case where the weight-average molecular weight of the bifunctional urethane (meth)acrylate oligomer is 4,000 or more and 8,000 or less, the film uniformity, abrasion resistance, bendability, and chemical resistance of the obtained cured film are further excellent.

As shown in Examples 5, 10, and 11 in Table 9, in a case where the copolymerization amount of vinyl chloride is 80% to 90% by mass and the copolymerization amount of vinyl acetate is 10% to 20% by mass as the copolymerization ratio in the vinyl chloride-vinyl acetate copolymer, ink jet jettability is further excellent.

As shown in Examples 5, 12, and 13 in Table 9, in a case where the content of another polymerizable compound is smaller than the content of the bifunctional urethane (meth) acrylate oligomer, the ink jet jettability, and the abrasion resistance and chemical resistance of the obtained cured film are further excellent.

As shown in Examples 5 and 14 to 17 in Table 10, in a case where the content of the vinyl chloride-vinyl acetate copolymer is 1% by mass or more and 3% by mass or less with respect to the total mass of the liquid composition, and in a case where the ratio value (M2/M1) between the total content M1 of the polymerizable compound and the total content M2 of the vinyl chloride-vinyl acetate copolymer contained in the liquid composition is 0.1 or more and 0.4 or less, the ink jet jettability, and the abrasion resistance, bendability, and chemical resistance of the obtained cured film are further excellent.

As shown in Examples 5 and 18 to 21 in Table 10, in a case where the total content of the polymerizable compound and the vinyl chloride-vinyl acetate copolymer contained in the liquid composition is 10% by mass or more and 20% by mass or less with respect to the total mass of the liquid composition, ink jet jettability, and the coating uniformity, abrasion resistance bendability, and chemical resistance of the obtained cured film are further excellent.

As shown in Examples 22 to 26 in Table 11, in a case where the content of the organopolysiloxane compound is 1.5 parts by mass or more and 15 parts by mass or less with respect to the total 100 parts by mass of the polymerizable compound and the vinyl chloride-vinyl acetate copolymer, the ink jet jettability, and the abrasion resistance and chemical resistance of the obtained cured film are further excellent.

As shown in Examples 22 and 27 to 29 in Table 12, in a case where the boiling point of the organic solvent is 150° C. or higher and 250° C. or lower, the ink jet jettability, and the film uniformity, abrasion resistance bendability, and chemical resistance of the obtained cured film are further excellent.

3. Printing of Pattern 2 after Changing Base Material

The L2/L1 of the base material shown in Table 13 was measured using a shape analysis Laser microscope (VK-X 250/260, manufactured by Keyence Corporation). On the base material, printing of Pattern 2 was performed by the ink jet printer. As the liquid composition A, a set of C2, M2, Y2, and K2 shown in Table 6 was used. A yellow solid image of a size of 20×12 cm was printed and a base material having a decorative layer formed thereon was prepared. On the decorative layer, a protective layer was formed by using T1, T6, T21, T22 or T35 shown in Table 14 as the liquid composition B. With respect to each of the prepared samples, the coverage, the abrasion resistance, the bendability, the chemical resistance, and the ink jet jetting stability were evaluated based on the evaluation standards.

In order to form the protective layer in the samples used for measurement of coverage, separately, each compound obtained by adding 1 part by mass of the cyan pigment mill base with respect to 100 parts by mass of the transparent liquid composition T1, T6, T21, T22, or T35 shown in Table 14 was used.

The evaluation results were collectively shown in Table 14.

TABLE 13

| Base material | | Supplier | | L2/L1 |
|---|---|---|---|---|
| Gloss polyvinyl chloride sheet | MPI 1005 Super Cast | MPI 1005 | Avery products corporation | 1.05 |
| Polyurethane (PU) leather | ERNA | YP528 | YAMAPLAS CO., LTD. | 1.11 |
| Polyvinyl chloride (PVC) leather | CUPPUCCINO | CP-830 | YAMAPLAS CO., LTD. | 1.21 |
| Polyvinyl chloride (PVC) leather | ARES | YP606 | YAMAPLAS CO., LTD. | 1.33 |

TABLE 14

|  |  | Example 30 T1 | Example 31 T21 | Example 32 T22 | Example 33 T6 | Comparative Example 14 T35 |
|---|---|---|---|---|---|---|
| Organic solvent | 3-Methoxybutyl Acetate | 78.7 | 78.7 | 78.7 | 85 | 85 |
| Oligomer | SHIKO UV-3310B | 13 | 13.5 | 14.5 | 5 | 5 |
|  | SHIKO UV-7630B | 2 | 2 | 2 | 3.7 | 3.7 |
| Monomer | PEA | 0 | 0 | 0 | 0 | 0 |
| Specific copolymer | vinnol H14/36 | 2 | 1.5 | 0.5 | 2 | 0 |
| Silicone acrylic resin | CHALINE 175 | 0.3 | 0.3 | 0.3 | 0.3 | 0.3 |
| Polymerization inhibitor | UV22 | 1 | 1 | 1 | 1 | 1 |
| Photopolymerization initiator | Irg819 | 2 | 2 | 2 | 2 | 2 |
|  | Irg2959 | 1 | 1 | 1 | 1 | 1 |
| Mc/Mp |  | 0.13 | 0.10 | 0.03 | 0.23 | 0.00 |
| Ratio of Mp + Mc with respect to total mass of liquid composition |  | 17% | 17% | 17% | 11% | 9% |
| PVC leather ARES | Coverage | 4 | 4 | 3 | 4 | 1 |
|  | Abrasion resistance | 5 | 4 | 3 | 5 | 1 |
|  | Bendability | 4 | 4 | 4 | 4 | 5 |
|  | Chemical resistance | 4 | 3 | 3 | 4 | 1 |
|  | IJ jetting stability | 5 | 5 | 5 | 5 | 5 |
| PVC leather CUPPUCCINO | Coverage | 5 | 5 | 5 | 5 | 1 |
|  | Abrasion resistance | 5 | 5 | 5 | 5 | 1 |
|  | Bendability | 5 | 4 | 3 | 5 | 5 |
|  | Chemical resistance | 5 | 4 | 3 | 5 | 1 |
|  | IJ jetting stability | 5 | 5 | 5 | 5 | 5 |
| PU leather ERNA | Coverage | 5 | 5 | 5 | 5 | 2 |
|  | Abrasion resistance | 5 | 5 | 5 | 5 | 2 |
|  | Bendability | 5 | 5 | 4 | 5 | 5 |
|  | Chemical resistance | 5 | 5 | 4 | 5 | 2 |
|  | IJ jetting stability | 5 | 5 | 5 | 5 | 5 |
| Gloss polyvinyl chloride sheet MPI 1005 | Coverage | 5 | 5 | 5 | 5 | 2 |
|  | Abrasion resistance | 5 | 5 | 5 | 5 | 2 |
|  | Bendability | 5 | 5 | 5 | 5 | 5 |
|  | Chemical resistance | 5 | 5 | 5 | 5 | 2 |
|  | IJ jetting stability | 5 | 5 | 5 | 5 | 5 |

As clearly seen from the results of Table 14, it is found that in a case of using the ink jet liquid composition according to the embodiment of the present disclosure, with respect to various base materials having an irregular shape on the surface thereof, the film uniformity, abrasion resistance, and chemical resistance of the obtained cured film are excellent.

Example 34

4. Pattern Formed on Both Decorative Layer and Protective Layer Using Liquid Composition According to Embodiment of Present Disclosure The liquid composition used was introduced into the ink jet printer and printing of Pattern 2 was performed. As the liquid composition A, a set of C1, M1, Y1, and K1 shown in Table 5 was used. A yellow solid image of a size of 20×12 cm was printed and a base material having a decorative layer formed thereon was prepared. On the decorative layer, a protective layer was formed by using the transparent liquid composition T1 shown in Table 7 as the liquid composition B. With respect to the prepared sample, the coverage, abrasion resistance, bendability, and chemical resistance were evaluated based on the evaluation standards.

In order to form the protective layer in the sample used for measurement of coverage, separately, a compound obtained by adding 1 part by mass of the cyan pigment mill base with respect to 100 parts by mass of the transparent liquid composition T1 shown in Table 7 was used.

The evaluation results were such that the point of the coverage (coating uniformity) was 5, the point of the abrasion resistance was 5, the point of the bendability was 5, and the point of the chemical resistance was 5.

The entirety of the disclosure of Japanese Patent Application No. 2016-192045 filed on Sep. 29, 2016, is incorporated herein by reference.

All documents, patent applications and technical standards mentioned herein are incorporated in the present specification by reference to the same extent as if each individual document, patent application or technical standard was specifically and individually indicated to be incorporated by reference.

What is claimed is:

1. An ink jet liquid composition comprising:
    an organic solvent;
    a bifunctional urethane (meth)acrylate oligomer having a weight-average molecular weight of 2,000 to 15,000;
    a photopolymerization initiator; and
    a vinyl chloride-vinyl acetate copolymer,
    wherein a content of the organic solvent is 40% by mass or more and 90% by mass or less with respect to a total mass of the liquid composition, and wherein a total content of a polymerizable compound and the vinyl chloride-vinyl acetate copolymer contained in the liquid composition is 10% by mass or more and 20% by mass or less with respect to the total mass of the liquid composition.

2. The ink jet liquid composition according to claim 1, wherein a total content Mp of a polymerizable compound and a total content Mc of the vinyl chloride-vinyl acetate copolymer contained in the liquid composition satisfy the following relationship $$0.1 \leq Mc/Mp \leq 0.4.$$

3. The ink jet liquid composition according to claim 1, wherein a content of the vinyl chloride-vinyl acetate copolymer is 1.0% by mass or more and 3.0% by mass or less with respect to the total mass of the liquid composition.

4. The ink jet liquid composition according to claim 1, wherein a boiling point of the organic solvent is 150° C. or higher and 250° C. or lower.

5. The ink jet liquid composition according to claim 1, wherein a total content Md of a bifunctional (meth)acrylate compound and a total content Mm of a polyfunctional (meth)acrylate compound contained in the liquid composition satisfy Md>Mm.

6. The ink jet liquid composition according to claim 1, further comprising:
an organopolysiloxane compound.

7. The ink jet liquid composition according to claim 6, wherein a content of the organopolysiloxane compound is 1.5 parts by mass or more and 15 parts by mass or less with respect to a total 100 parts by mass of a polymerizable compound and the vinyl chloride-vinyl acetate copolymer.

8. The ink jet liquid composition according to claim 6, wherein the organopolysiloxane compound is a compound having a polysiloxane chain and an acrylic resin chain.

9. The ink jet liquid composition according to claim 1, wherein a colorant is not contained.

10. An ink jet recording method comprising:
a step of applying the ink jet liquid composition according to claim 1 to a base material by an ink jet recording head.

11. The ink jet recording method according to claim 10, wherein the base material is a base material having an irregular shape in at least a part of a surface.

12. The ink jet recording method according to claim 10, wherein the base material is leather.

13. An ink jet recording method comprising:
a step of preparing a base material having a decorative layer formed thereon;
a step of applying the ink jet liquid composition according to claim 1 to the decorative layer by an ink jet recording head;
a step of drying the ink jet liquid composition on the decorative layer by applying heat; and
a step of curing the ink jet liquid composition by irradiating the ink jet liquid composition with an ultraviolet ray,
wherein the base material having the decorative layer formed thereon has an irregular shape in at least a part of a surface.

14. The ink jet liquid composition according to claim 1, wherein a content of the organic solvent is 50% by mass or more and 90% by mass or less with respect to a total mass of the liquid composition.

15. The ink jet liquid composition of claim 1, further comprising water in an amount of 5% by mass or less with respect to the total mass of the liquid composition.

* * * * *